(12) United States Patent
Bowler et al.

(10) Patent No.: US 9,553,775 B2
(45) Date of Patent: Jan. 24, 2017

(54) DISPLAYING INFORMATION IN A HIERARCHICAL STRUCTURE

(71) Applicant: General Instrument Corporation, Horsham, PA (US)

(72) Inventors: David B. Bowler, Stow, MA (US);
Brian M. Basile, Lancaster, MA (US);
Shaoting Gu, Acton, MA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 227 days.

(21) Appl. No.: 14/252,016

(22) Filed: Apr. 14, 2014

(65) Prior Publication Data

US 2014/0310605 A1    Oct. 16, 2014

Related U.S. Application Data

(60) Provisional application No. 61/811,322, filed on Apr. 12, 2013.

(51) Int. Cl.
*G06F 3/048* (2013.01)
*H04L 12/24* (2006.01)

(52) U.S. Cl.
CPC .............. *H04L 41/22* (2013.01); *H04L 41/06* (2013.01); *H04L 41/12* (2013.01)

(58) Field of Classification Search
CPC . H04L 12/2803–12/2818; H04L 41/00–41/22; H04L 43/045; G06F 3/048–3/04883; G06F 11/073–11/0793; G06F 17/509
See application file for complete search history.

(56) References Cited

U.S. PATENT DOCUMENTS

| | | |
|---|---|---|
| 4,558,358 A | 12/1985 | Onda |
| 6,400,863 B1 | 6/2002 | Weinstock et al. |
| 2003/0126255 A1* | 7/2003 | Rice ........................ H04L 12/24 709/224 |
| 2004/0031059 A1* | 2/2004 | Bialk ..................... H04L 41/065 725/129 |
| 2005/0043933 A1* | 2/2005 | Rappaport .............. H04L 41/22 703/1 |
| 2005/0219151 A1* | 10/2005 | Li ....................... H04L 12/2602 345/7 |

OTHER PUBLICATIONS

Web Content entitled, "Digital Video, DOCSIS and HFC Network Monitoring Services", iGlass Networks via URL http://www.iglass.net/cable-telecom.aspx, Apr. 10, 2014.

* cited by examiner

*Primary Examiner* — Claudia Dragoescu
(74) *Attorney, Agent, or Firm* — Stewart M. Wiener

(57) ABSTRACT

Methods and systems for displaying information in a hierarchical structure are disclosed. An embodiment provides a method for displaying HFC network monitoring information and alarms in a hierarchical, topological fashion within a network monitoring system.

13 Claims, 26 Drawing Sheets

FIG. 1

| MESSAGE | SEVERITY | LOCATION |
|---|---|---|
| FEC CORRECTED THRESHOLD EXCEEDED | WARNING | US CH 10 |
| FEC UNCORRECTED THRESHOLD EXCEEDED | MINOR | US CH 20 |
| FLAP THRESHOLD EXCEEDED | WARNING | US CH 10 |
| CHANNEL UTILIZATION EXCEEDED | WARNING | US CH 25 |

| TOPOLOGY | CRITICAL | MAJOR | MINOR |
|---|---|---|---|
| ▷ CMTS-1 | 0 | 0 | 4 |
| ▽ CMTS-2 | 2 | 2 | 1 |
|    FN-A | 2 | 1 | 1 |
|    FN-B | 0 | 0 | 0 |
| ▷ CMTS-3 | 0 | 0 | 0 |
| ▷ CMTS-4 | 0 | 0 | 0 |
| ▷ CMTS-5 | 0 | 0 | 0 |

ALARM TOPOLOGY TREE EXPANDS OUT TO DISPLAY CONTEXT SENSITIVE ALARM COUNTS

*FIG. 6*

| CABLE MODEM TOOLS | | |
|---|---|---|
| ⌾ MAP | ▯ TABLE | |
| CABLE MODEM TOOLS | | |
| 2c 9e 5f cf 54 9b | -3846781535303707 | |
| 3c 75 4a 33 b1 23 | -3158565929 1768 | |
| 3c 75 4a 33 b1 4c | -3749026167078 0015 | |
| 3c 75 4a 33 b1 2b | -2537506092479951 | |
| 3c 75 4a 33 b1 3c | -2702664200909586 3 | |
| 3c 75 4a 33 b1 30 | -27783812 79883495 | |
| | -3764312980598045 | |

| Topology | Critical | Major | Minor |
|---|---|---|---|
| CMTS-1 | 4 | 2 | |
| FN-A | 4 | 2 | |
| CM 1 | 1 | | |
| CM 2 | 1 | | |
| CM 3 | 1 | | |
| CM 4 | 1 | | |
| CM 5 | | 1 | |
| CM 6 | | 1 | |
| CM 7 | | | |
| CM 8 | | | |

Table 1 Sample captured cable modem alarms sorted by severity

| Topology | Critical | Major | Minor |
|---|---|---|---|
| CMTS-1 | 4 | 2 | |
| FN-A | 4 | 2 | |
| Tap-1 | 3 | | |
| CM 1 | 1 | | |
| CM 2 | 1 | | |
| CM 3 | | 1 | |
| Tap-2 | 1 | 1 | |
| CM 4 | 1 | | |
| CM 7 | | 1 | |
| CM 8 | | | |
| CM 6 | | | |
| CM 5 | 1 | | |
| CM 6 | 1 | | |

Table 2 sample captured cable modem alarms sorted using the disclosed parent sorting

DISPLAYING INFORMATION IN A HIERARCHICAL STRUCTURE

PRIORITY

This application claims the priority under 35 U.S.C. §119 of U.S. Provisional Patent Application No. 61/811,322, titled "DISPLAYING INFORMATION IN A HIERARCHICAL STRUCTURE," filed on Apr. 12, 2013, which is herein incorporated by reference in its entirety.

BACKGROUND

Traditionally, a monitoring system for a cable network, such as a hybrid fiber-coaxial (HFC) network, can show a physical topology of the network from headend to fiber node, all the way down to cable modems. In a display, a user can see how many service alarms are in the system, and can drill down to the problematic cable modems reporting alarms.

HFC networks generally comprise a cable modem termination system at a headend, and elements such as fiber nodes, radio frequency (RF) trunk amplifiers, RF splitters, RF taps, as well as cable modems downstream at a end user side. Traditionally, a cable network monitoring system will show the physical topology of the network from headend to fiber node all the way down to the cable modems, allowing a network operator to see, for example, how many service alarms are in the system and to visually drill down in a user interface (UI) to information identifying a problematic cable modem that reported the alarms.

Program providers such as multiple system operators, television networks and stations, cable TV operators, satellite TV operators, studios, wireless service providers, and Internet broadcasters/service providers, among others, require broadband communication systems to deliver programming and like content to consumers/subscribers over networks via digital or analog signals. Such networks and physical plants tend to be extensive and complex and therefore are difficult to manage and monitor for faults, impairments, maintenance issues and the like.

Monitoring network maintenance activities particularly presents problems to operators of extensive cable networks. For purposes of example, a cable network may include a headend which is connected to several nodes that may provide access to Internet Protocol (IP) or ISPN networks. The cable network may also include a variety of cables such as coaxial cables, optical fiber cables, or a Hybrid Fiber-Coaxial (HFC) cable system which interconnect terminal network elements of subscribers to the headend in a tree and branch structure. The terminal network elements (media terminal adaptors (MTAs), cable modem, set top box, etc.) reside on the nodes which may be combined and serviced by common components at the headend.

Cable modems may support data connection to the Internet and other computer networks via the cable network. Thus, cable networks provide bi-directional communication systems in which data can be sent downstream from the headend to a subscriber and upstream from a subscriber to the headend. The headend typically interfaces with cable modems via a cable modem termination system (CMTS) which has several receivers. Each receiver of the CMTS may connect to numerous nodes which, in turn, may connect to numerous network elements, such as modems, media terminal adaptors (MTAs), set top boxes, terminal devices, customer premises equipment (CPE) or like devices of subscribers. A single receiver of the CMTS, for instance, may connect to several hundred or more network elements.

The conventional process for tracking which terminal devices are attached to which optical node and like information is a manual process. For instance, when a new customer's services are first enabled, a network operator may identify the specific node or location of the user and enter this information manually into a customer management database. This information can be valuable for resolving physical layer communications issues, performing periodic plant maintenance, and planning future service expansions. However, when the data is inaccurate or incomplete, it can lead to misdiagnosis of issues, excessive costs associated with maintenance, and prolonged new deployments. In addition, as communication traffic increases or new services are deployed, the need to understand loading of parts of the network becomes important, particularly if existing subscribers must be reallocated to different nodes or parts of the network.

Based on conventional practice, locating and identifying network and physical plant issues essentially relies upon the receipt of customer calls and manual technician analysis in response thereto.

BRIEF DESCRIPTION OF THE DRAWINGS

Various features of the embodiments described in the following detailed description can be more fully appreciated when considered with reference to the accompanying figures, wherein the same numbers refer to the same elements. Network Monitoring FIG. 1 is a snapshot screen view of a so-called dashboard of a graphical user interface according to an embodiment.

FIG. 6 is a view similar to FIG. 5 with the alarm tree further expanded in accordance with an embodiment.

FIG. 13 is a snapshot view of a display screen of the tablet providing a list of faulted modems in accordance with an embodiment.

Displaying Information in a Hierarchical Structure

Figure 22:
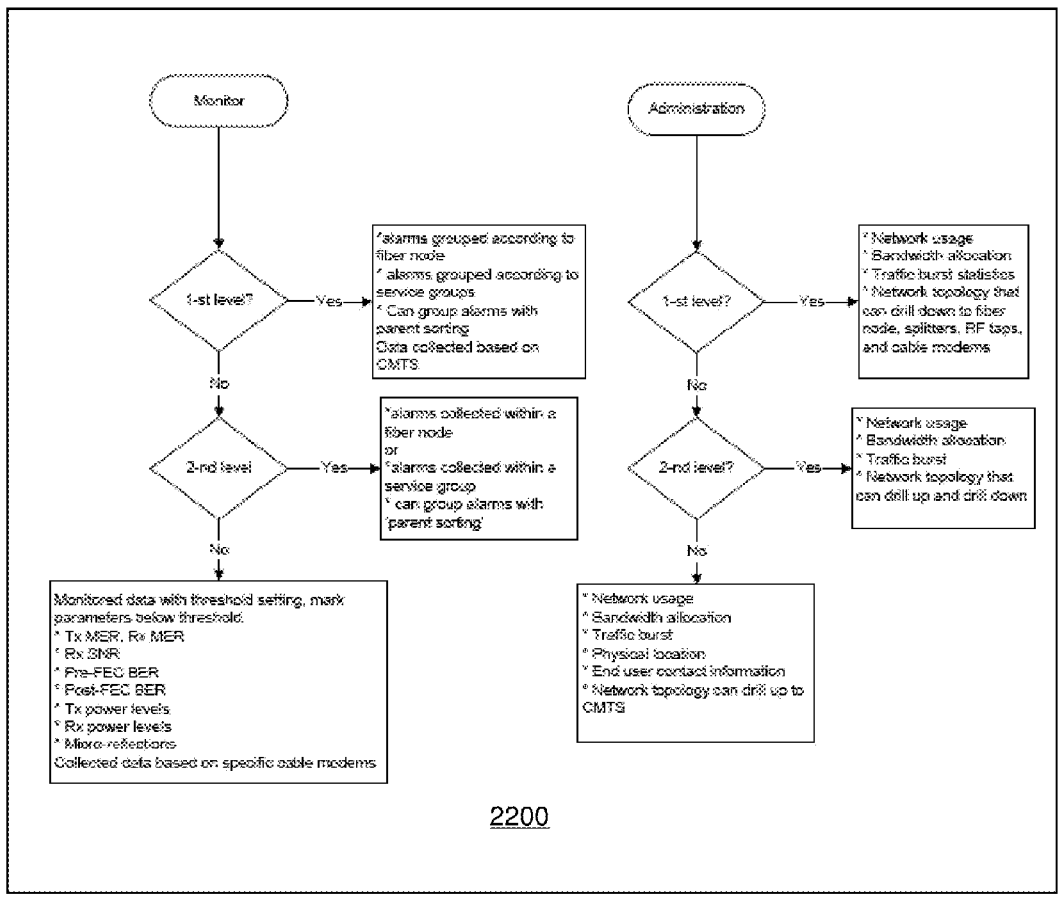

FIG. 22 depicts an RF Data Tree Process flowchart, according to an embodiment.

Figure 23:
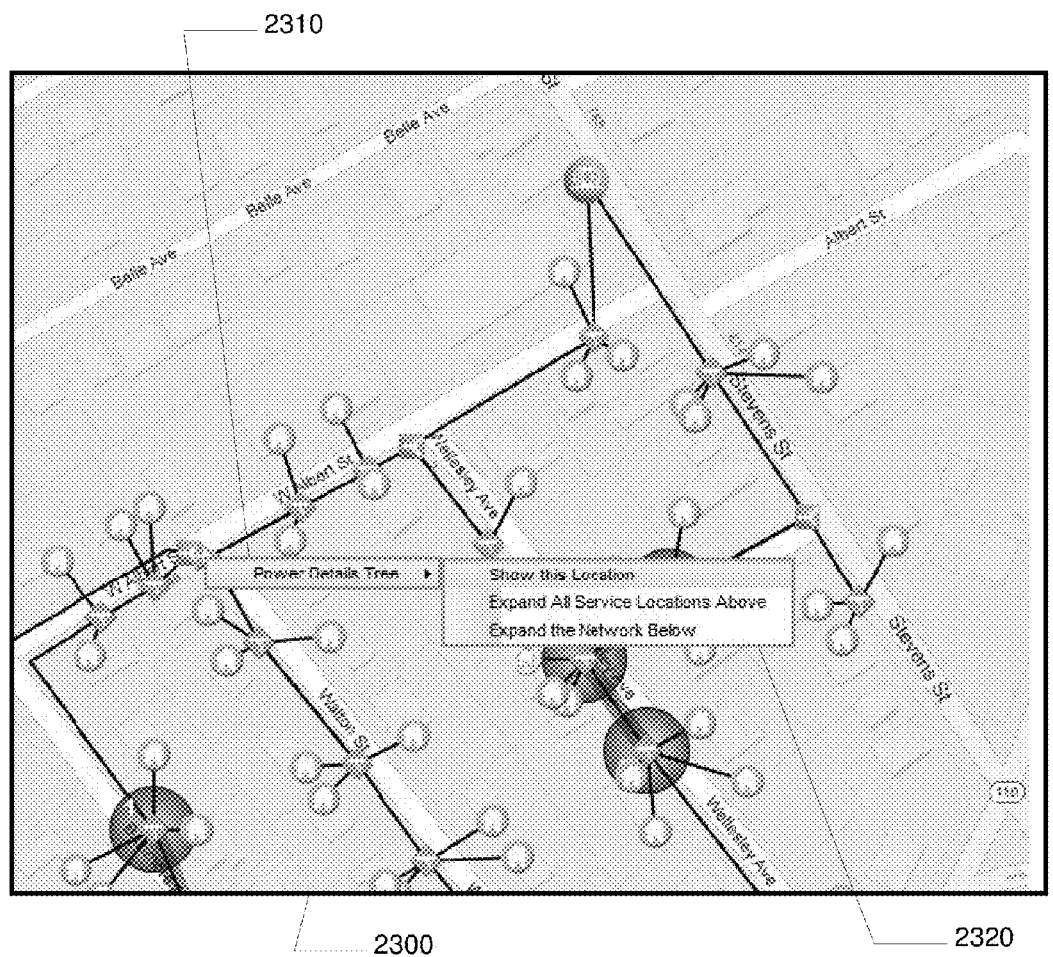

FIG. 23 depicts launching hierarchical view from map, according to an embodiment.

Figure 24:
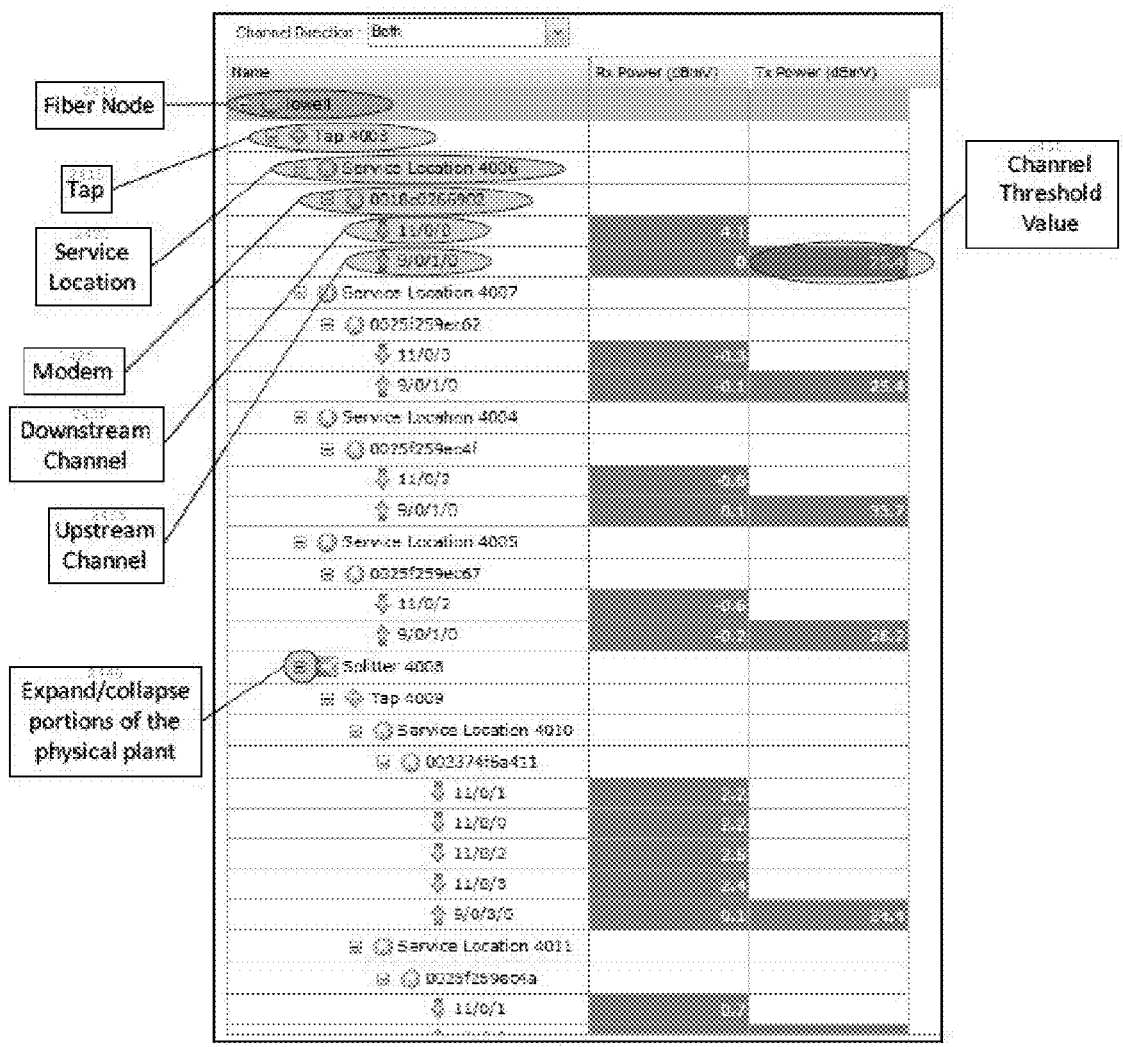

FIG. 24 depicts a hierarchical threshold value view, according to an embodiment.

Figure 25:
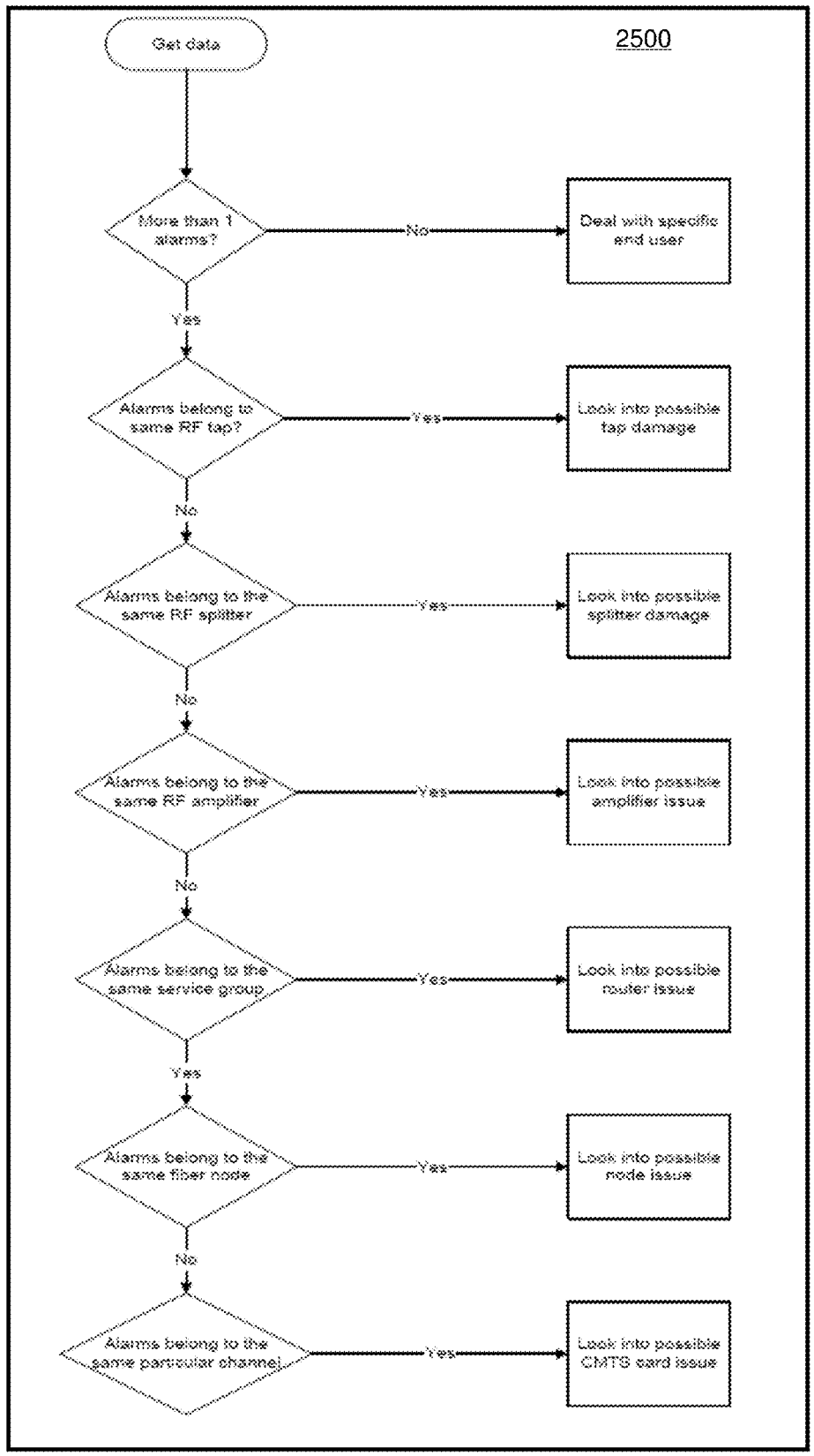

FIG. 25 illustrates a cable network system monitoring and debugging process flow, according to an embodiment.

FIG. 26A depicts Table 1, a table of sample captured cable modem alarms sorted by severity, according to an embodiment.

FIG. 26B depicts Table 2, a table of sample captured cable modem alarms sorted using the disclosed parent sorting, according to an embodiment.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Embodiments provide a convenient way to display a problematic cable modem's relationships with other modems or infrastructure elements. In an illustrative embodiment, a method is provided for displaying HFC network monitoring information and alarms in a hierarchical, topological fashion within a network monitoring system.

Embodiments provide a way of presenting information to the user of the monitoring system in a hierarchical fashion that reflects the HFC network topology and emphasizes the relationships between the end devices (cable modems) and network infrastructure elements (taps, amplifiers, fiber nodes).

Monitoring Tool

Automated management and monitoring systems, tools, and methods enable issues occurring in a network, such as a cable network, to be proactively and automatically detected and located. The embodiments leverage a combination of key data and network topology such as information concerning the geographical location of an issue, the nature of the issue, and/or the severity of an issue to permit a network operator to quickly detect, isolate, locate and address problems. In addition, collection and analysis of historical, long term and periodic health information of a network provided by the embodiments can aid in determining trends that may indicate slow and steady degradation of a network element or component. Such degradation has conventionally remained undetected when relying only on manual spot checks by field technicians and only becomes detectable upon component failure.

According to embodiments, the above referenced tasks are accomplished automatically by a management and monitoring tool that is able to scale across extremely large networks thereby enabling network operators to become more proactive with network maintenance activities and to achieve higher levels of network availability and reliability. Operational costs can be reduced by decreasing the need for troubleshooting at a time after the occurrence of the problem or issue. In addition, the periodic collection and analysis of network conditions provides a view into critical network indicators and aids in resolving issues prior to customer impact.

Network monitoring can be performed such that information concerning geographic location of monitored network elements, such as cable modems or the like, and associated network component topology, such as HFC components and the like, are automatically populated into a network management database or the like for purposes of providing a visual display, such as a geographically accurate street map or satellite image of a region of a service area, that clearly indicates a fault or other issue and the geographical location thereof. Examples are provided by FIGS. 15-20. Thus, the path that the network takes geographically is displayed on the map along with the physical location of network elements and components within the network. Such a map provides a useful network management tool to network operators and field technicians for resolving issues in an efficient and prompt manner.

As one contemplated example, the map can be provided as part of a graphical interface which displays faults of varying severity levels ranging from critical to completely non-service affecting. Accordingly, in at least some embodiments, the severity of a fault on the network can be determined and displayed with the estimated geographic location of the fault on the map.

In addition, the network monitoring and management system or tool can be provided and fully integrated into software that is loaded and resides on a server or remote server connected to or communicating with the network. Of course, the software may reside on other devices and equipment such as equipment located at the headend of the network, cloud devices, and portable or mobile devices. Utilization of the software eliminates the need for manual analysis of data and permits large amounts of data to be automatically analyzed electronically by microprocessors or the like on a large scale.

The network management tool or software may estimate and make assumptions regarding probable tap and passive locations, and couple this information with known optical node location data, and with walking directions data from a geographical data (geodata) services provider. Walking directions data may be in accordance with an appropriate format, language, or standard; examples include, but are not limited to, data in Keyhole Markup Language (KML), e.g., Open Geospatial Consortium (OGC) KML, or the OpenGIS KML Encoding Standard. From this cumulative information, the network management tool or software can estimate and automatically populate a map or the like of a given service area with monitored cable modem locations and associated network component topology. See FIGS. 15-20 for examples.

The geographic location of a fault and surrounding network path can be estimated, isolated, and displayed despite minimum information and manually entered data concerning the actual network path or network element location being available. The graphical interface can identify and display specific network elements as problematic. As an example, a network or HFC component such as cables, taps, passives, or the like that is identified as a suspect component potentially contributing to linear distortion, excessive loss impairments, or the like may be identified and displayed as a location of a fault. Whether a fault impacts a single subscriber or a group of subscribers may also be estimated and shown in the display.

Still further, the network management tool may be used to identify clusters or groups of network elements or cable modems that may share network or HFC infrastructure, such as common components including optics, nodes, amps, cables, taps, passives, and the like. In this regard, Management Information Base (MIB) information for service groups readily available via data pulls from a CMTS or like equipment at the headend of the network can be used in conjunction with the above referenced geographical location information. Network element groups or clusters can be readily displayed via the graphical interface and without the need for the software to reference other sources, perform testing, or wait for common impairment signature alarms to be raised.

Still further, the severity of a fault may be estimated with respect to upstream impairments through association of physical layer metrics including pre and post forward error correction (FEC) along with the number of impacted network elements or subscribers. Higher priority alarms can be assigned to groups of network elements or subscribers that exceed threshold values. In contrast, lower priority alarms can be assigned to faults such as detected for single network elements or subscribers.

According to an embodiment, the graphical interface referenced above may be presented in the form of a so-called "dashboard" to a user such as personnel of a network operations center. Critical alarms may be shown across the entire network in a geographical display of the network or parts thereof. In addition, access may be provided to statistics via use of the dashboard to allow the user to monitor the overall health of their network.

By way of example, various snap-shot views of a graphical user interface are provided in FIGS. 1-14. It should be understood that these displays are disclosed for purposes of example only and may be altered as desired.

Figure 1:
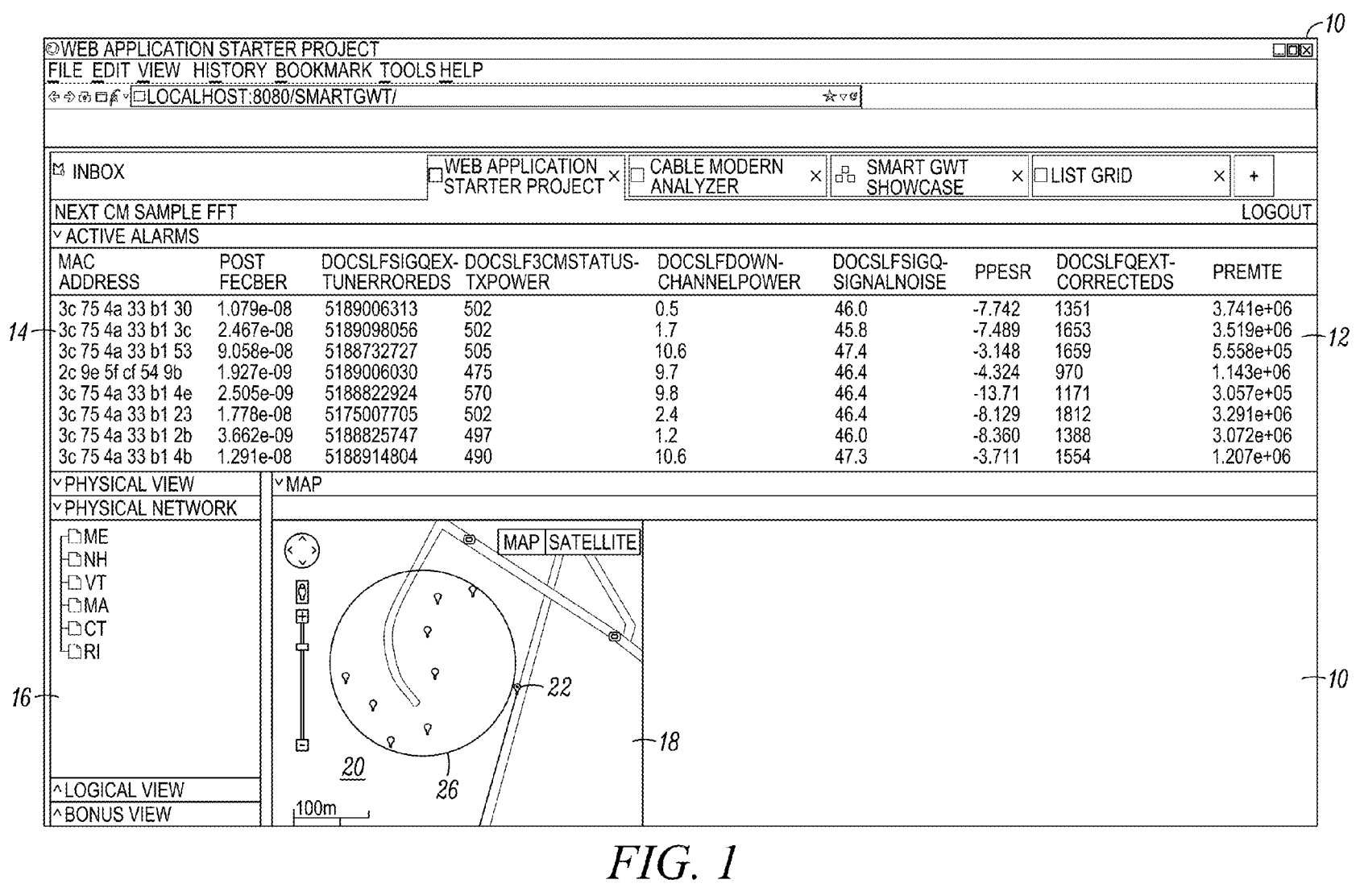
Figure 2:
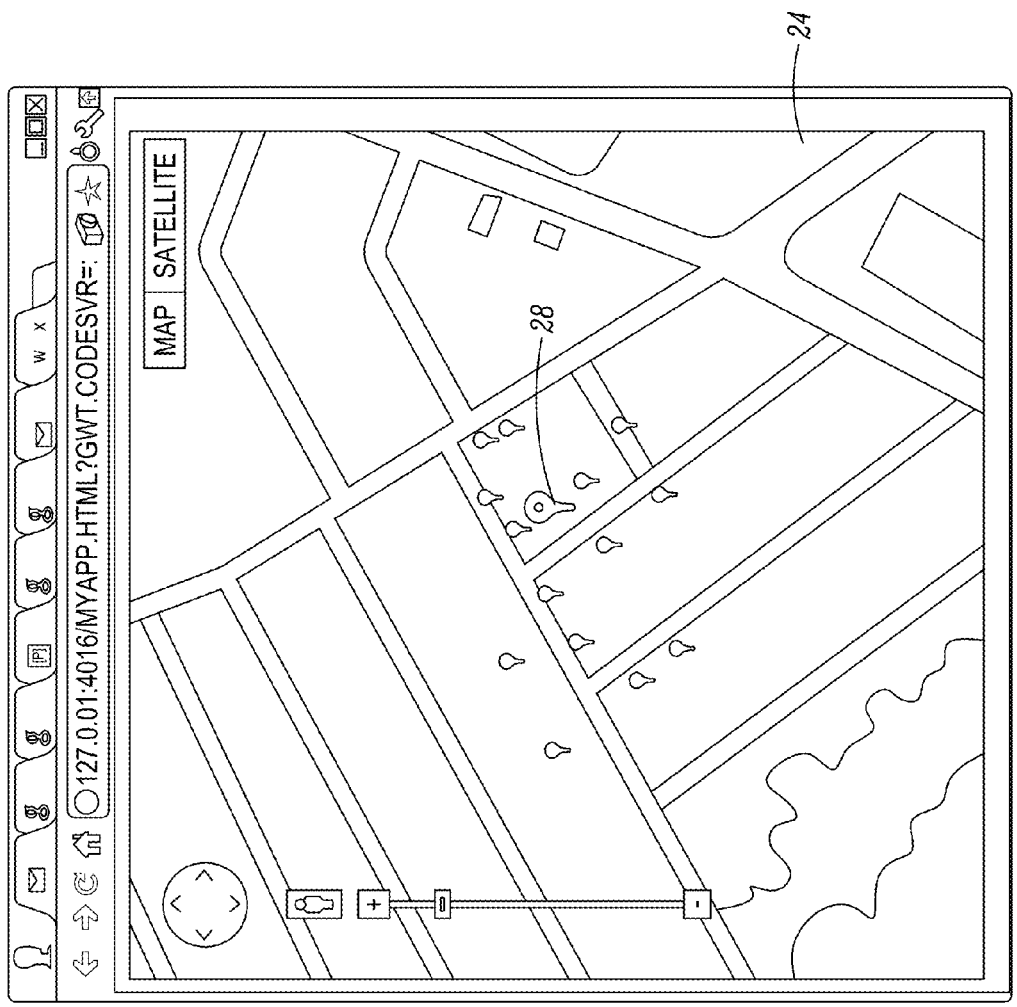
FIG. 2 is a view of a panel of the dashboard showing a cluster of objects displayed on top of a satellite image of a geographic area into which a network extends according to an embodiment.

A first example of a dashboard 10 which may be displayed to a user via a monitor or like electronic display screen is shown in FIG. 1. In this example, a first panel 12 of the dashboard 10 provides information of "Active Alarms" including a list of alarms or potential faults 14, a second panel 16 provides a so-called "Physical View" of the network, and a third panel 18 provides a geographically-accurate street map 20 showing the geographical location of the alarms listed in panel 12 along with the nearest node 22 or other network component. The map 20 may include roads and streets and names thereof. In addition, as best illustrated in FIG. 2, alarms can be overlaid on images 24, for instance satellite images, of the geographical service area in which the alarms are located.

When an issue, fault or alarm is identified, it can be associated and displayed with other issues, faults and alarms based on geographical proximity. For instance, see the alarms 14 within circle 26 in FIG. 1. This group or cluster of alarms provides a visual indicator of the network elements affected and can indicated a center point of a potential problem causing the cluster of alarms. For instance, see the center point 28 in FIG. 2. A user which selects the center point may be provided with a listing of problem network elements or modems. In addition, the cluster of alarms may have a single corresponding "alarm" object to thereby reduce the number of alarms displayed to the user.

After an issue is first identified by the network monitoring and management system, tool or software, the operator or user may be provided with several options to further investigate the apparent problem or problems. For instance, network issues may be isolated by "serving group" or "geographic proximity" (i.e., clustering) and may be prioritized by severity based on the number of customers/subscribers affected and the extent to which faults are service-affecting. The network faults can be linked by the management software to a map interface which enables the fault to be connected to a physical location in the network.

FIGS. 3-11 provide further examples of views of a dashboard which may be displayed to a network operator. Any type or number of available charts, maps, or alert views can be viewed and organized in the dashboard. By way of example, the dashboard 30 shown in FIG. 3 may be configured as a starting point when a user first logs onto the network monitoring and management software or system. Here, a "zoomed-out" view of the network is initially provided to permit an overall view of the network, which may span a large geographic area. Data is collected and analyzed by the network monitoring and management tool to identify a type of fault or faults and the estimated geographic location of the fault(s) solely based on analysis of the data.

Figure 3:
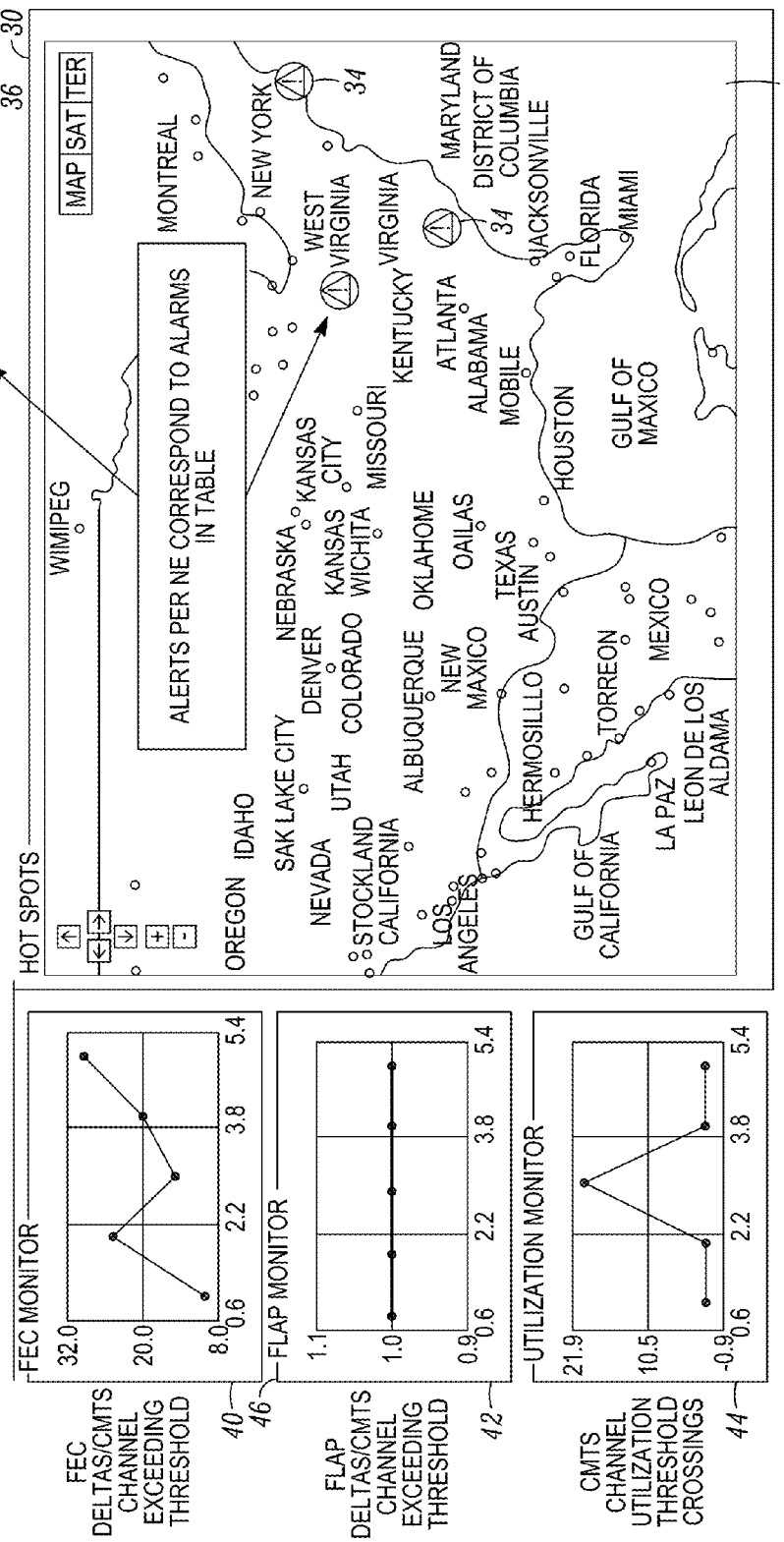
FIG. 3 is a view of an interactive user interface display which may provide a starting point of the dashboard once a user logs into the system according to an embodiment.
Figure 4:
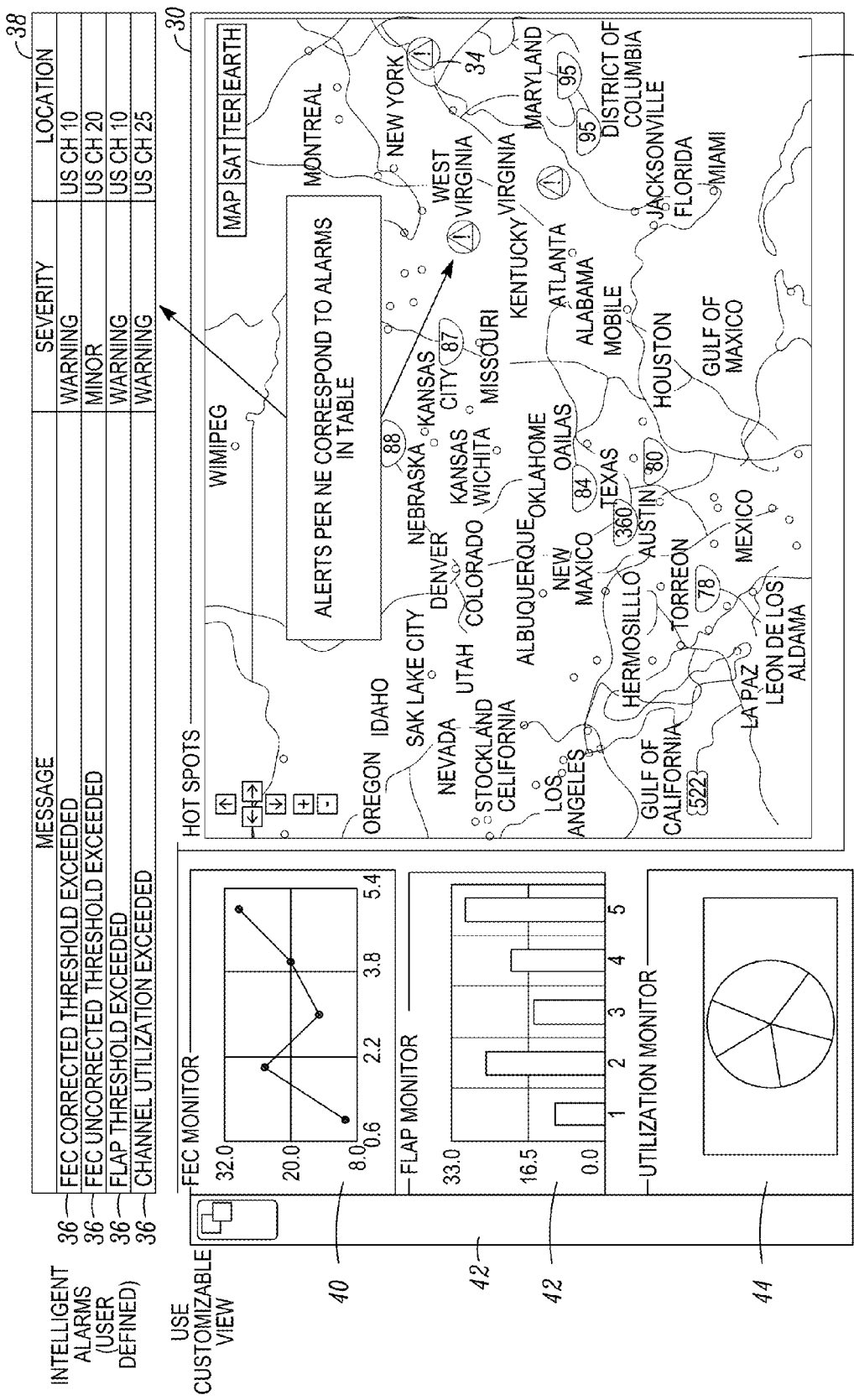
FIG. 4 is a view similar to FIG. 3 with the map further zoomed-in to a particular region of the network service area according to an embodiment.

FIG. 3 provides an entire network view 32 based on a geographic format and provides an indication of so-called "hot-spots" 34 of alarms. A listing 36 of alarms can be provided in a panel 38 which can also indicate the severity and location of the hot-spots 34. Charts such as a FEC deltas/CMTS channel exceeding threshold chart 40, a Flap deltas/CMTS channel exceeding threshold chart 42, and a CMTS channel utilization threshold crossing chart 44 can be displayed in a panel 46 and correspond to the alarms shown in the listing 36. Of course, these charts provide just a few examples of possible charts. A further example of such a dashboard is shown in FIG. 4 which provides a display of a section of the map 48 in greater detail.

Figure 5:
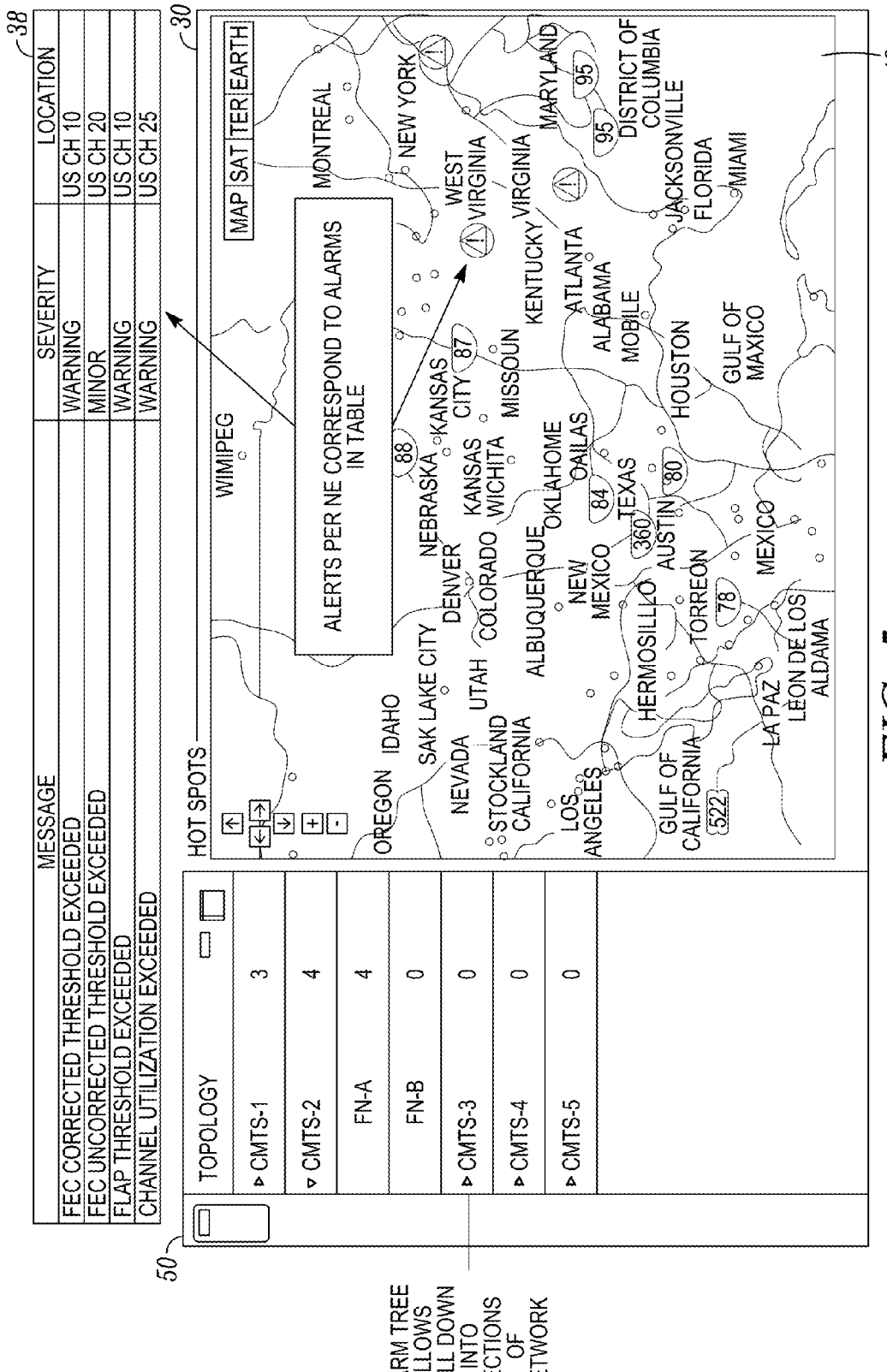
FIG. 5 is a view of an interactive user interface display which shows an alarm tree for use in investigating information of alarms shown on the display according to an embodiment.

In FIG. 5, a dashboard is shown in which panel 50 provides information on network topology. Here, the topology is provided in a form of a so-called alarm tree which enables a user to gain further information with respect to more narrowly defined sections of the network. For example, the topology could list CMTSs (such as CMTS-1, CMTS-2, CMTS-3, CMTS-4, and CMTS-5). Further, the fiber nodes (i.e., FN-A and FN-B) can be shown for any of the CMTSs and a number of network elements associated with an alarm can be listed. As shown in FIG. 6, the panel 50 can also be expanded to show the number of network elements associated with alarms per severity of alarm (i.e., critical, major, and minor).

Figure 7:
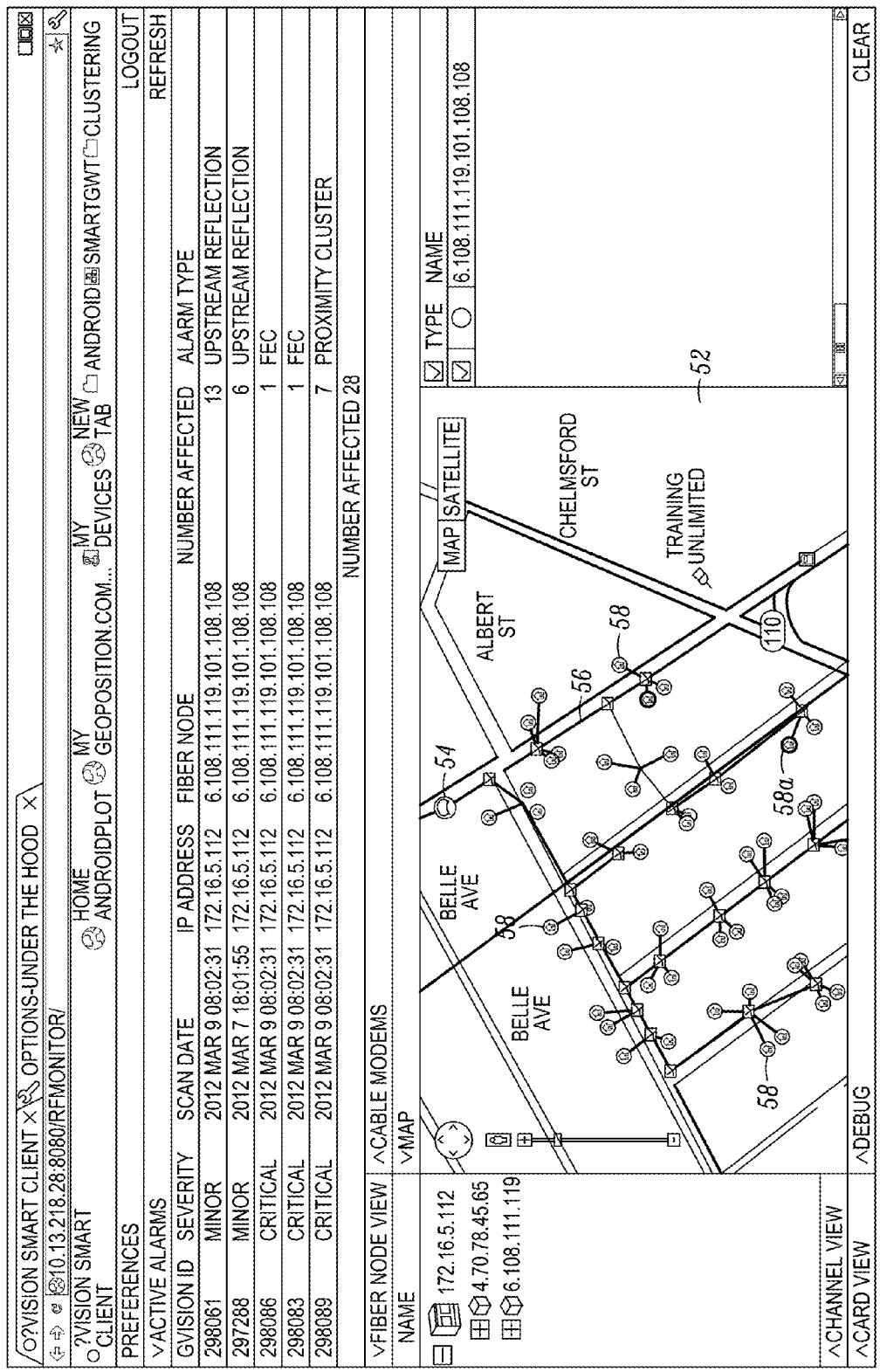
FIG. 7 is a view of a graphical user interface with a local geographic map showing a node location, terminal network elements, network path, and alarms in accordance with an embodiment.
Figure 8:
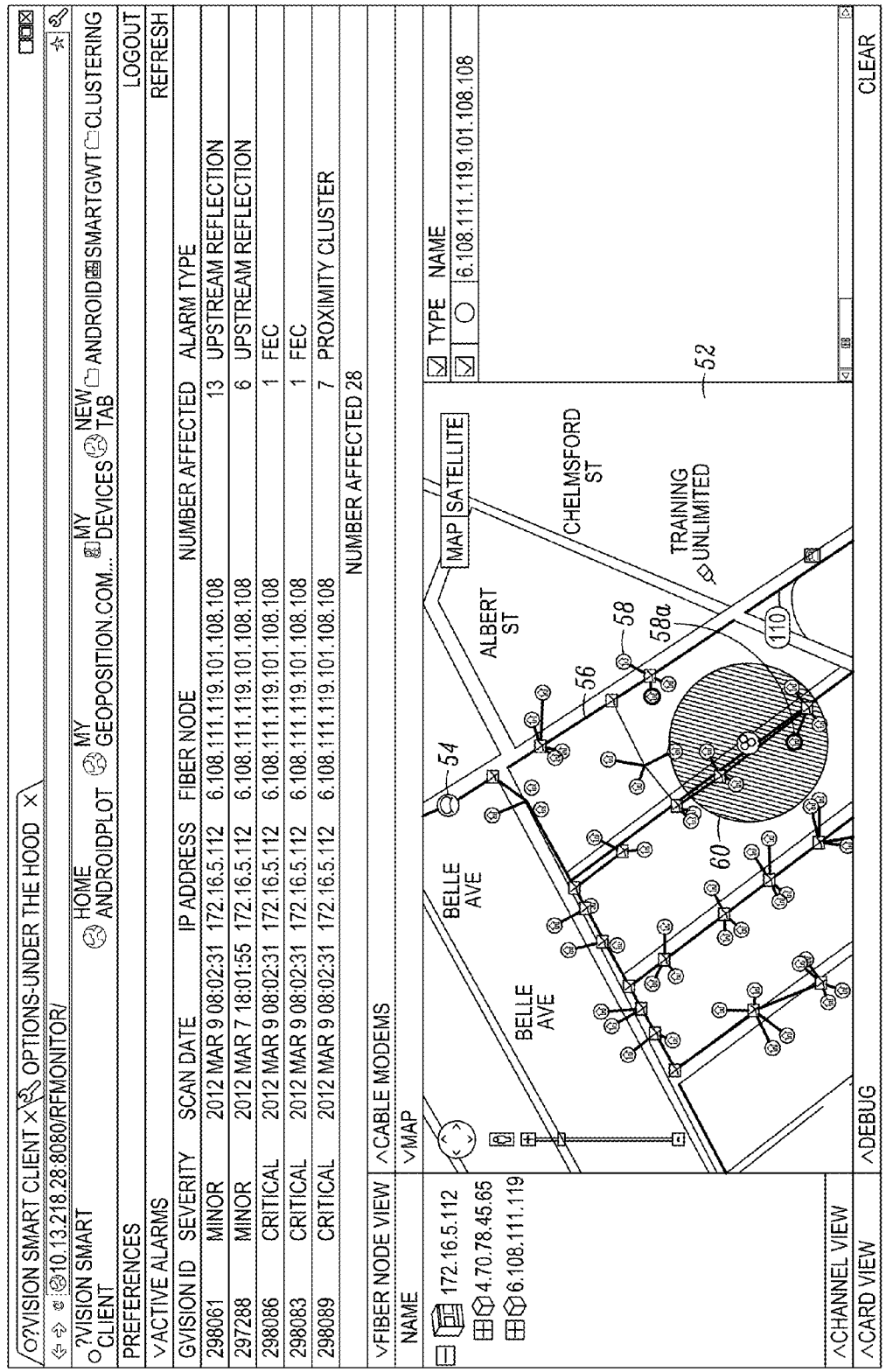
FIG. 8 is a view of a graphical user interface similar to FIG. 7 with a cluster of terminal network elements highlighted based on geo-proximity in accordance with an embodiment.

A more local view of a street map 52 is shown in FIG. 7. Here a single fiber node 54 of the network is shown as is the network path 56 extending from the node 54 to terminal network elements 58, such as cable modems, serviced via the node 54. The shade (or color, etc.) of the terminal networks elements 58 can be used to visually indicate an alarm on the map 52. For instance, terminal network element 58a is shown in a dark shade (or a particularly color, such as red) which may indicate an alarm of critical severity whereas terminal network elements displayed in lighter shades (other colors, such as yellow) may indicate an alarm of a minor severity. This same map 52 can be further investigated as shown in FIG. 8 in which a geo-proximity cluster 60 is shown highlighted. The path 56 of the cable plant may be estimated and shown such as in FIGS. 7 and 8. If desired, the user of the management tool is able to adjust the path 56 or enter in any known network topology information into the management software or tool should the estimated path and view be inaccurate.

Figure 9:
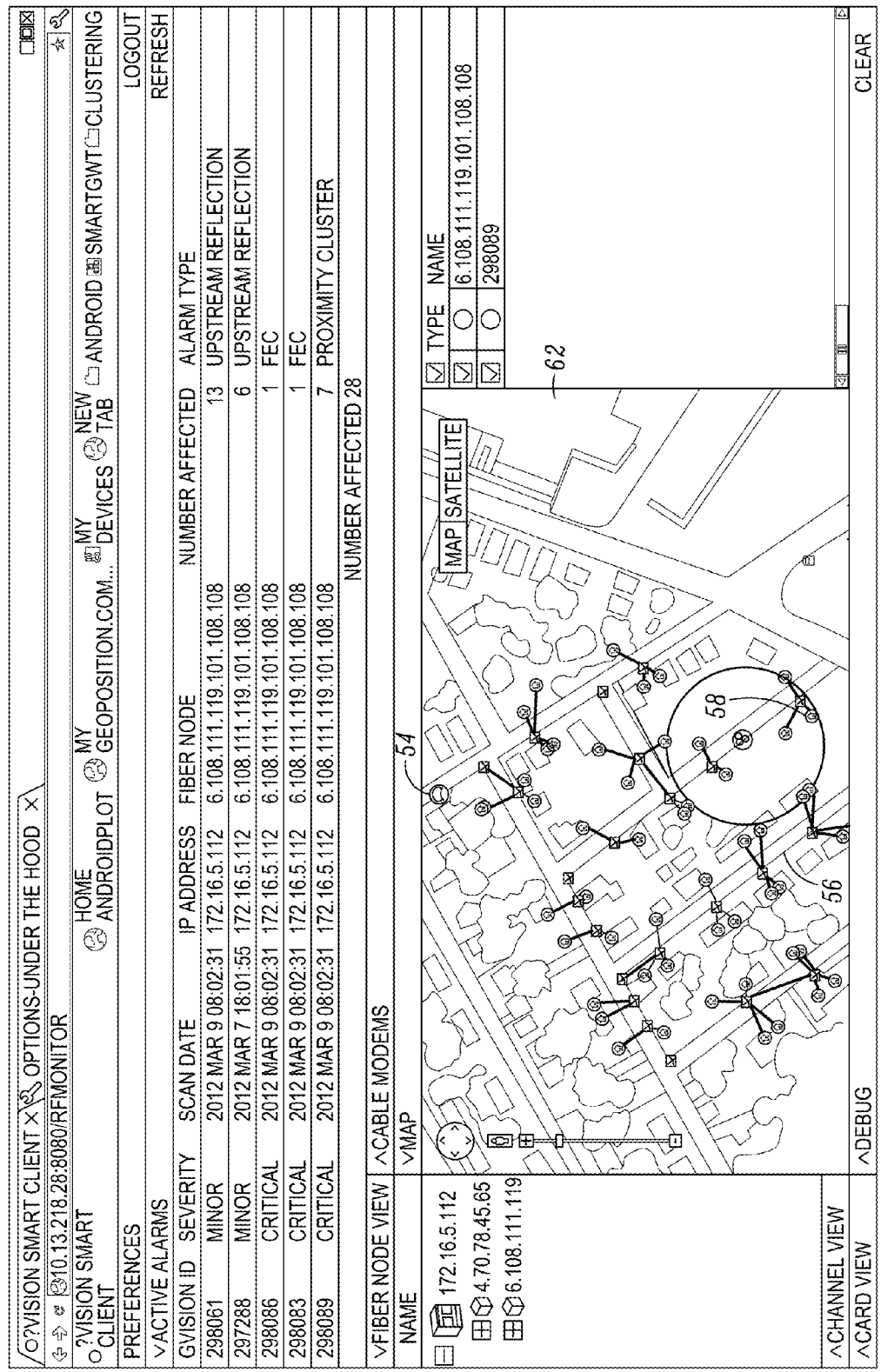
FIG. 9 is a view of a graphical user interface similar to FIG. 8 that is displayed on a satellite image of the geographic area according to an embodiment.
Figure 10:
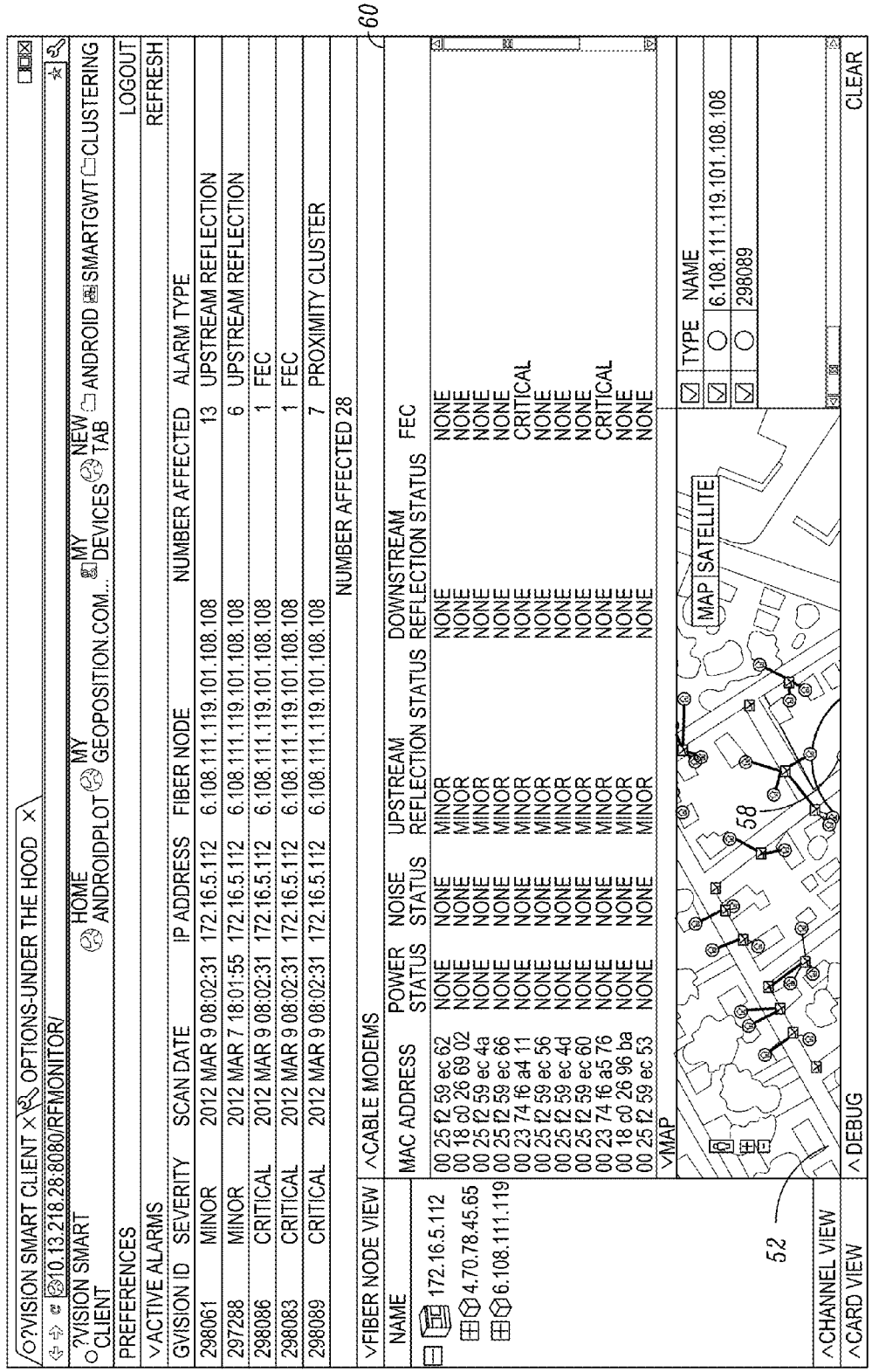
FIG. 10 is a view of a graphical user interface similar to FIG. 9 and including a listing of alarms for the cable modems displayed on the map according to an embodiment.
Figure 11:
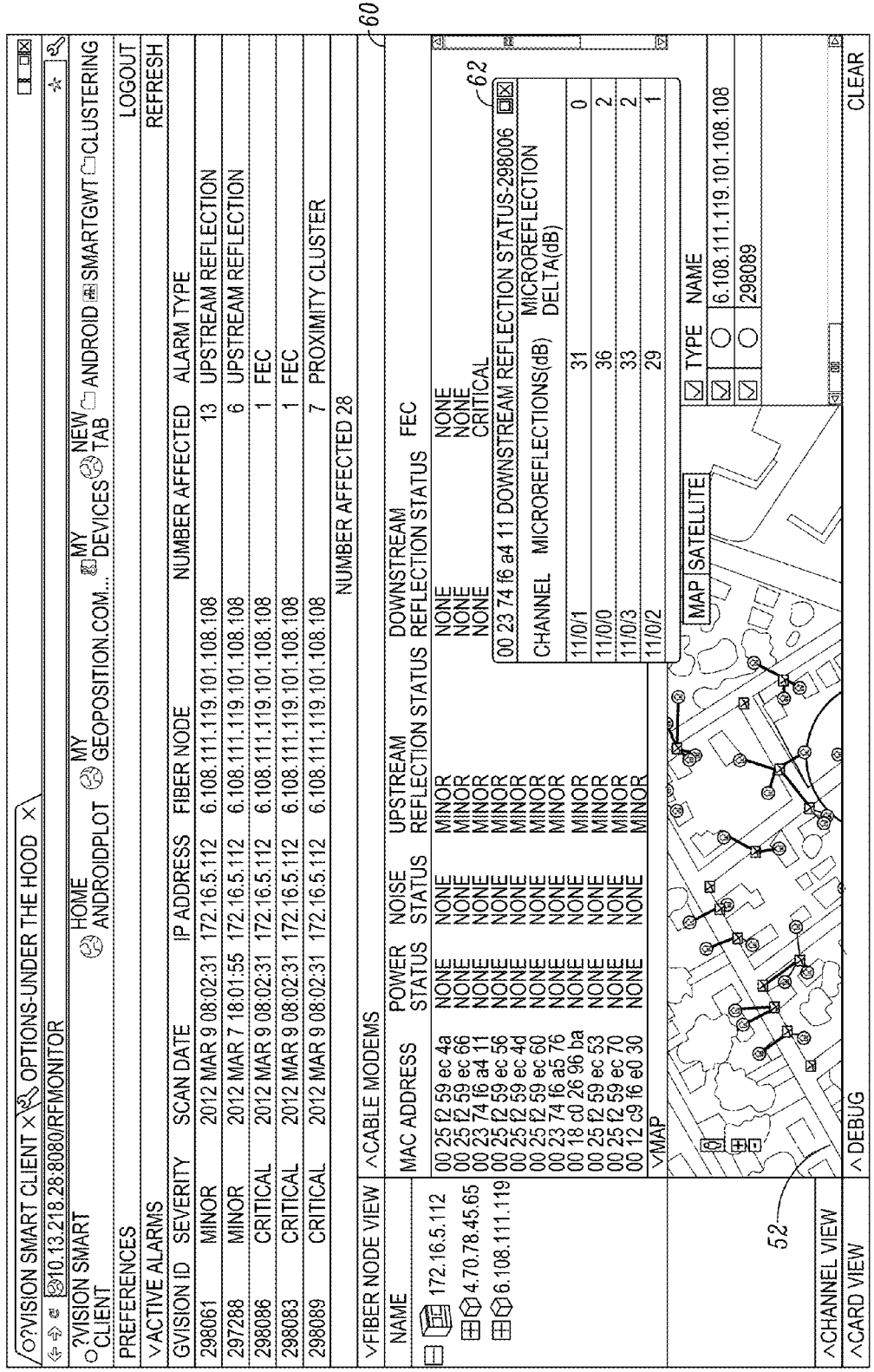
FIG. 11 is a view of a graphical user interface similar to FIG. 10 and including a listing of a particular performance parameter (in this instance, downstream microreflections in dBs for absolute and delta values) for the cable modems displayed on the map and channels used thereby according to an embodiment.

Another view similar to FIG. 7 is shown in the map 62 of FIG. 9. Here the street map 52 has been modified to show actual satellite imagery of the surrounding geographic area. The node 54, path 56, and terminal network elements 58 are overlaid on the satellite imagery as are the alarms and other network topology. For purposes of further investigating a potential network fault, the "cable modems" illustrated in FIG. 9 can be shown in a drop down window 64 such as shown in FIG. 10. Here the MAC address, power status, noise status, upstream reflection status, downstream reflection status, FEC status for each cable modem or terminal network element 58. Some of these cable modems and listed statuses have no alarms whereas others have alarms of "minor" severity while others have alarms of "critical" severity. FIG. 11 shows the ability of the tool to further investigate network issues. Here, measurements corresponding to downstream microreflections in dBs are listed (as absolute and delta values) and shown in a window 66 so that a user may view these or any other values that are or are not the subject of an alarm.

Accordingly, after a network operator center user views the above referenced dashboards and investigates alarms therewith, for instance as shown above, and has identified a particular issue that needs to be resolved, the network monitoring and management tool, software or system can be used to assist the user in sending an appropriate field technician to the correct geographical location. The user can also use the management tool or software to assess the urgency with respect to the need to resolve the issue.

The network monitoring and management system, tool or software can also be used by a service technician in the field. For example, the network monitoring and management software may be run on a remote server that is accessible by the technician such as via a secure wireless web interface. For instance, a mobile device, such as a portable, laptop, notebook, or tablet computer, a smart phone, or the like may be used to obtain various views, information and maps as discussed above. Accordingly, provided information can be used for rapid, real-time debugging of field issues and provide geographic information, provide real-time monitoring of upstream and downstream performance metrics and error states, and permit a technician to see the interdependency of multiple issues. The above can reduce the need for the technician to access the inside of residences, reduce the number of calls the technician needs to make to the headend, and enable the technician to update network topology information while in the field. For purposes of this disclosure, "real-time" includes a level of responsiveness that is sufficiently fast to provide meaningful data that reflects current or recent network conditions as well as a level of responsiveness that tolerates a degree of lateness or built-in delay.

Figure 12:
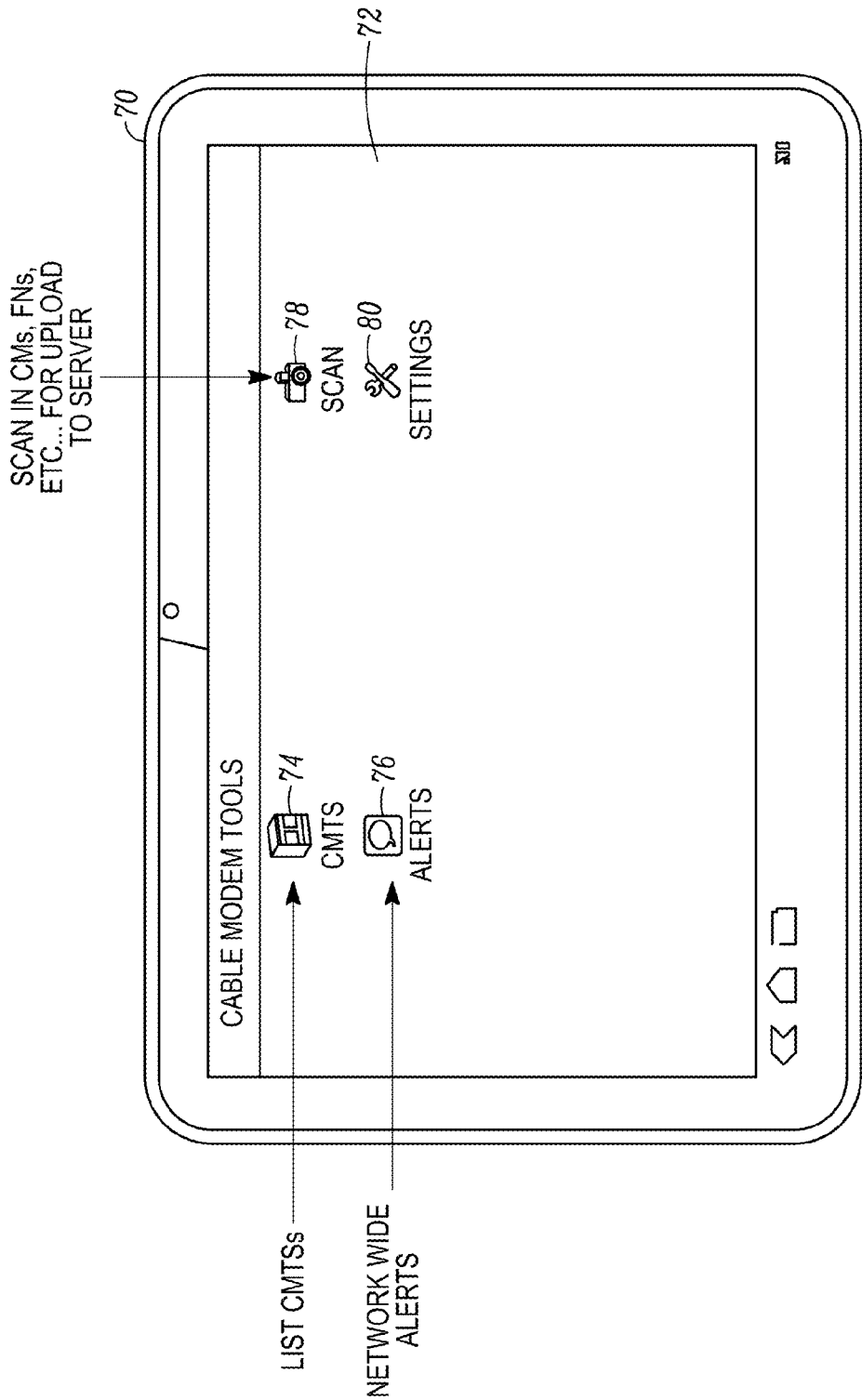
FIG. 12 is a view of a wireless communication tablet having a display screen that may be used by a field technician in accordance with an embodiment.
Figure 14:
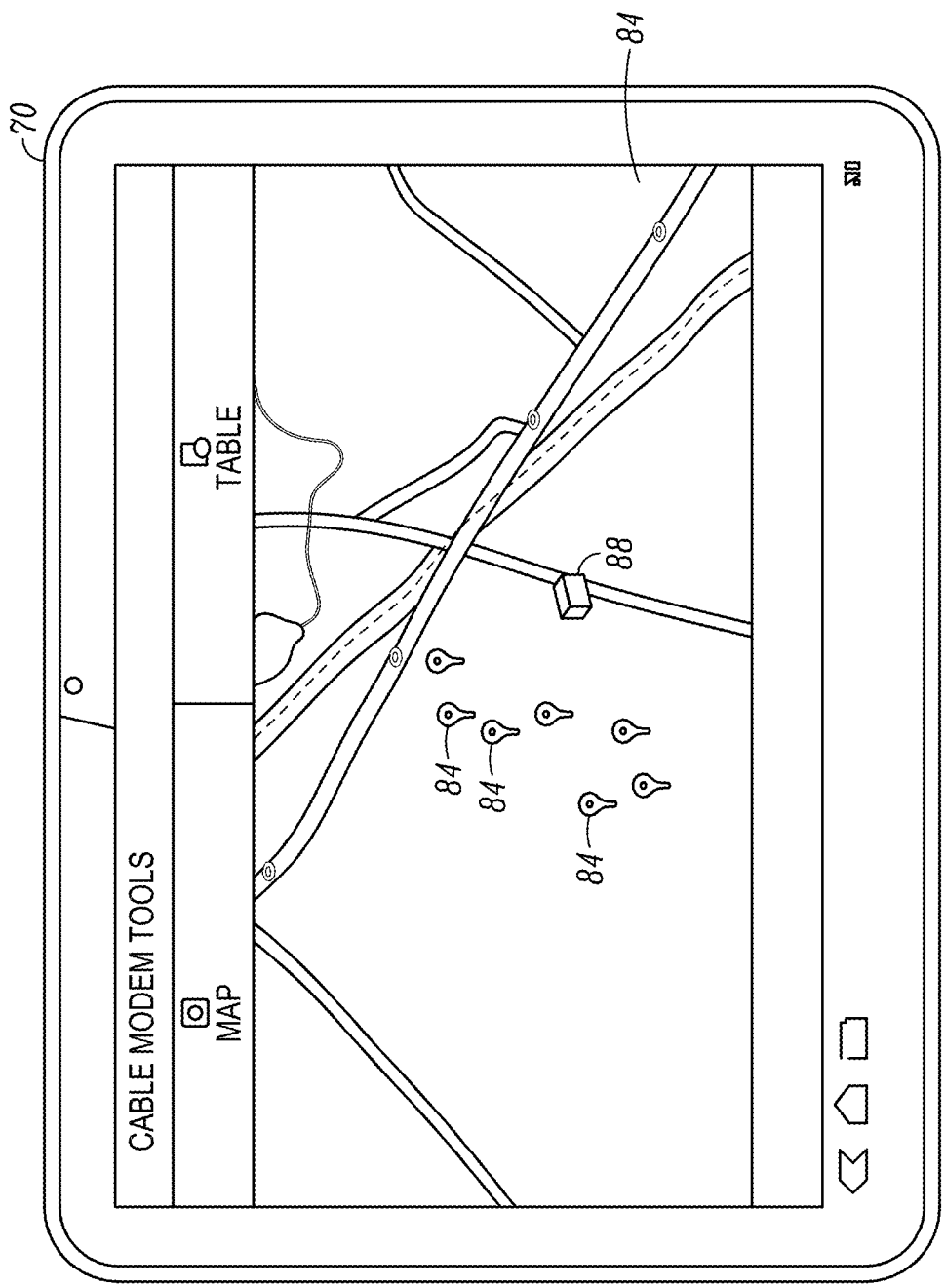
FIG. 14 is a snapshot view of a display screen of the tablet providing the geographic locations of the faulted modems on a street map in accordance with an embodiment.

A tablet 70 is shown in FIGS. 12-14 that may be used by a field technician to connect to the network monitoring and management software. In FIG. 12, the technician is provided with a display 72 that includes an icon 74 for a list of the CMTSs, an icon 76 for network wide alerts, an icon 78 for scanning or uploading information into the system, and a settings icon 80. FIG. 13 shows a display 82 providing a tabular view of network devices 84 having faults, and FIG. 14 shows a display 86 showing the same network devices 84 in a geographical map-style platform with the closest fiber node 88 or like network component. All of the above provides helpful and useful information to the field technician.

Various methods can be used by the network monitoring and management system, software, and tool described above that enables fault determination, fault location, mapping of the network geographically, displaying of faults with and without network topology information, displaying a cluster of network elements impacted by the same fault, and the severity of the fault. For example, a combination of monitored parameters and network topology information can be used to identify the likely physical locations of cable network defects. This approach is able to be implemented in software utilizing numerical analysis. In addition, a combination of sub-algorithms can be used to locate a common network failure point even when several different and potentially, seemingly unrelated, issues are observed.

Often, a single defect within a plant can cause multiple types of impairments to be recognized which may otherwise appear to be independent and arise from separate issues. Each of these impairments may trigger multiple, independent fault detection mechanisms within the network monitoring tool. However, not all of the fault detection algorithms may identify the same network element as a primary fault location (i.e. a location estimated to be the most likely point or source of the fault). However, the results of all of these independent fault detection/identification algorithms can be viewed together in an effort to significantly improve the accuracy of identifying a root cause of an issue in the presence of multiple fault signatures.

According to an embodiment, the above referenced network monitoring tool can be configured to automatically evaluate groups of separate issues affecting a set of cable modems sharing common network components to quickly and accurately identify a root cause of a particular issue. Thus, a grouping of otherwise seemingly unrelated alarms is analyzed, and a determination is made with respect to whether or not the issues might actually be related. If a relation is found, the relation is shown on a map or provided in an alternate form (such as within a listing) so that the root cause can be quickly located and addressed. Each alarm within the grouping is assessed and analyzed independently, and then the results are evaluated as a set to accurately locate the issue within the plant. In this manner, a plurality of alarm topologies is considered, and then a single accurate inspection list is generated for the root cause issue.

By way of example, the following algorithm may be used to prioritize fault location based upon the occurrence of multiple alarms. First, all active threshold alarms that may be associated with a particular fiber node being evaluated are automatically retrieved. Each alarm associated with the fiber node is evaluated independently with respect to estimated fault location on the network. Two or more of the alarms are considered to be part of the same issue if they share any fault topology points in common. Thereafter, an inspection list is generated and prioritized based on a priority ranking for each particular type of alarm (i.e., highest priority alarm, second highest, third highest, etc. . . . ). Here, the estimation as to fault location may be different depending upon the type of alarm and algorithm for such an alarm that is used.

The inspection points for each alarm are scored based upon their priority ranking. Simply for purposes of example, the highest priority alarm associated with each alarm may receive a score of ten (10) points and a second highest priority alarm for each alarm may receive a score of nine (9) points. Thereafter, all of the scores for a given inspection point (across all of the alarm types) are then added up and this sum total is assigned to the inspection point. The inspection point with the highest point totals is then given the highest priority as the root cause issue of all the alarms, the inspection point with the second highest point total is given the second highest priority as the root cause issued of all alarms, and so forth. Here, a point system is disclosed by way of example and the disclosed point system could be replaced by any type of point value system and/or ranking system involving letter grades or the like.

For purposes of providing an example with respect to the above described algorithm, four different alarm topologies 100, 102, 104 and 106 associated with a single plant defect and the same part of a network is shown in FIGS. 15-18. In each of these topologies 100, 102, 104 and 106, the physical location of a network fault may be estimated by receiving different types of information via data pulls including information concerning network components and geographic locations of the network components and terminal network elements and geographic locations of the terminal network elements. The existence of a network fault within the network can be automatically and electronically detected by monitoring various performance parameters, for instance, obtained via upstream communications from terminal network elements on the network.

A physical location of the network fault on the network may be estimated based on the particular performance parameter detected, the information of the physical topology of the network obtained, and the terminal network element or elements from which the performance parameter was received that indicated the network fault. Thereafter, a list of network components that may require inspection and may provide a source of the network fault can be automatically generated based on analysis of the performance parameter. By way of example, the listed network components may include drop cables, taps, trunk cables, splitters, amplifiers, nodes, and like components and the types of performance parameters may include downstream or upstream signal-to-noise ratio (SNR), absolute and delta downstream power (DS Power) level, absolute and delta upstream power (US Power) level, upstream echo (US Echo) level, downstream micro-reflection (DS Micro) level, upstream filter coefficient ratio, carrier-to-noise ratio (CNR), and modulation error ratio (MER).

For purposes of example, the network shown in FIGS. 15-20 may be a hybrid fiber-coaxial (HFC) network which interconnects terminal network elements, such as cable modems, to a headend (not shown) of the network having a cable modem termination system (CMTS) (not shown) via a tree and branch network structure. The upstream communications are herein defined as communications transmitted in a direction from the terminal network elements toward the headend.

A geographically-accurate map may be automatically and electronically populated with the geographic locations of network components to which a network fault is attributed, a geographic location of each the terminal network elements impacted by the network fault, and a diagnostic alarm identifying the network fault. The map may be displayable, for instance, with the use of geospatial software.

Different algorithms are used in each of the topologies 100, 102, 104 and 106 of FIGS. 15-18 to estimate the physical location of a fault. For this purpose, data is automatically gathered in real time and/or with an acceptable amount of delay by the CMTS, a server, or other equipment from cable modems in use by subscribers in the network to locate issues within the cable plant. As shown in FIGS. 15-18, a plurality of cable modems 110 are shown connected in tree and branch architecture via a node 112 which connects to the headend (not shown) of the network. The tree and branch architecture defines the path the network follows to each cable modem 110 and common network components on the network that may be shared by different subsets of cable modems.

Figure 15:
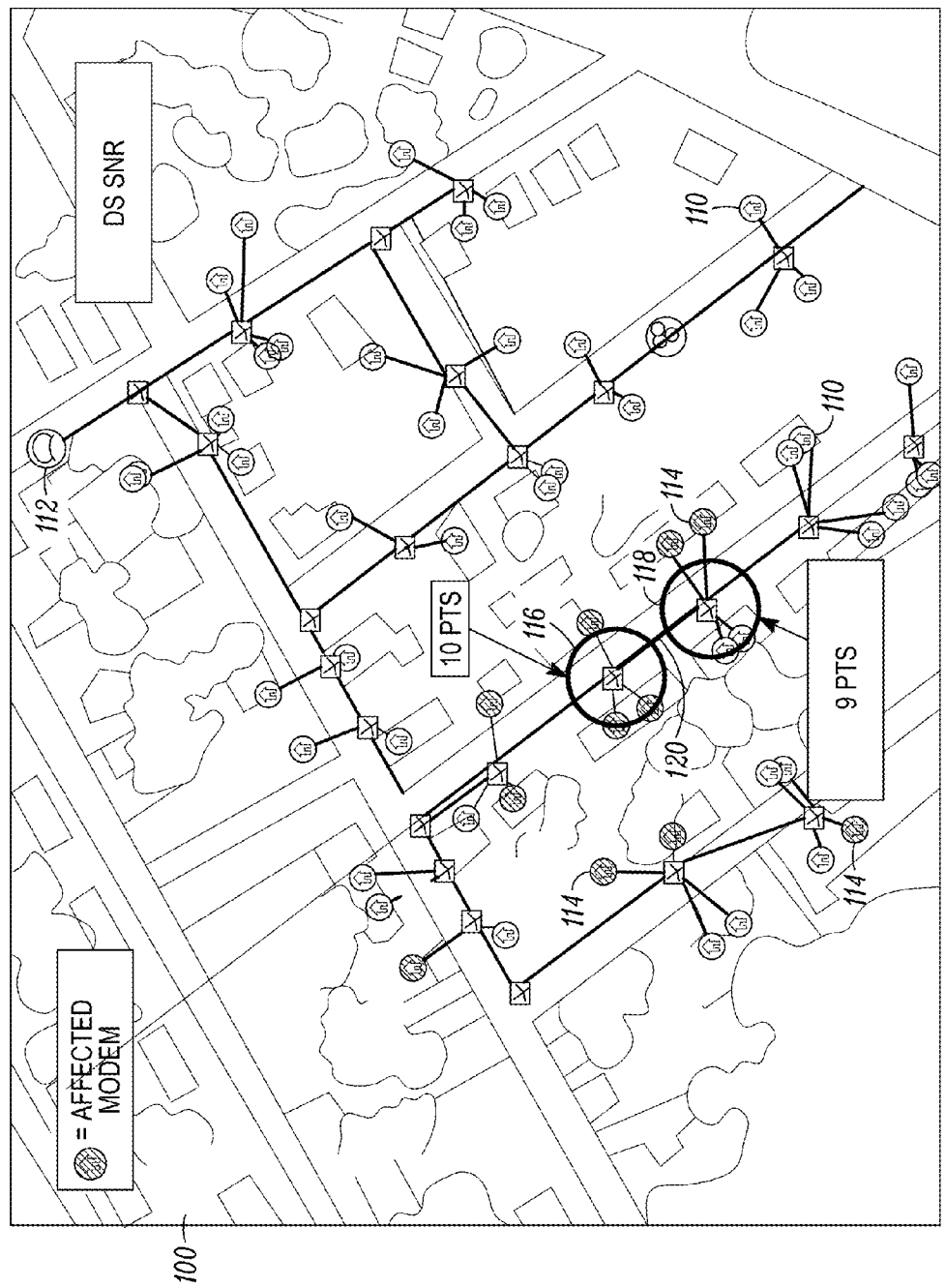
FIG. 15 is a view of a section of a network extending downstream from a fiber-optic node and in which cable modems affected by downstream signal-to-noise ratio at threshold levels are shown in accordance with an embodiment.

In FIG. 15, a plurality of the modems 114 is identified in a part of the network as having unacceptable downstream signal-to-noise-ratio (DS SNR) levels. Based on an analysis of the DS SNR data, it is determined that taps and splitter identified by the circle 116 represents the most likely source of the DS SNR issue. Thus, for example, this location may be assigned a value of ten (10) points. Likewise, the taps and splitter identified by the circle 118 may be determined to be the second most likely source of the DS SNR issue. Thus, for example, this location may be assigned a value of nine (9) points. The third most likely source of the issue shown in FIG. 15 is the cable 120 extending between the two above referenced splitters.

Figure 16:
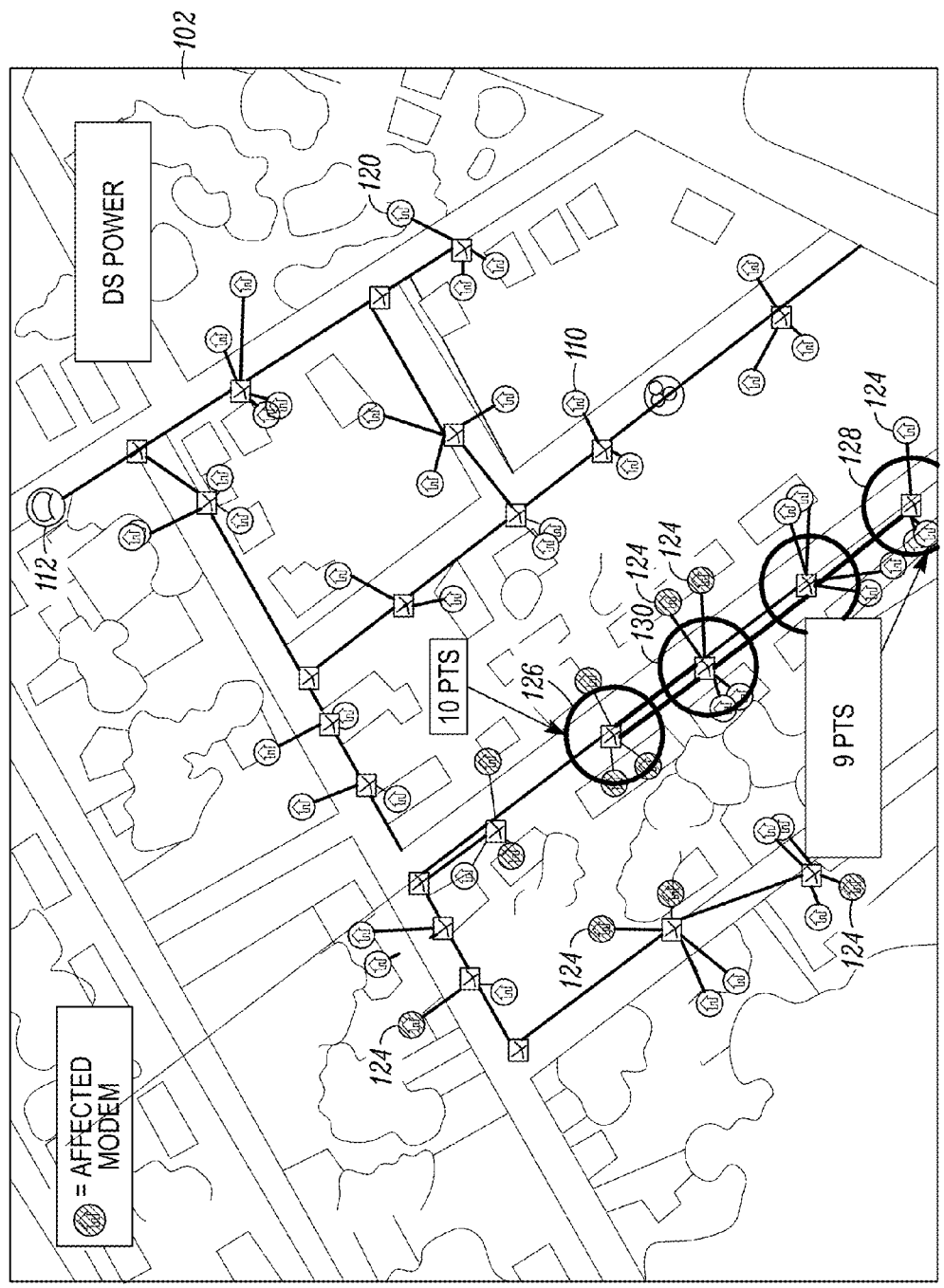
FIG. 16 is a view of the same section of the network as FIG. 15 in which cable modems affected by downstream power at threshold levels are shown in accordance with an embodiment.

In FIG. 16, a number of the modems 124 in the same part of the network is identified as having unacceptable downstream power (DS Power) levels. Based on an analysis of the DS Power data, it is determined that taps and splitter identified by the circle 126 represents the most likely source of the DS Power issue. Thus, for example, this location may be assigned a value of ten (10) points. Likewise, the taps and splitter identified by the circle 128 may be determined to be the second most likely source of the DS Power issue. Thus, for example, this location may be assigned a value of nine (9) points. The third most likely source of the issue shown in FIG. 16 is the splitter and taps referenced by circle 130.

Figure 17:
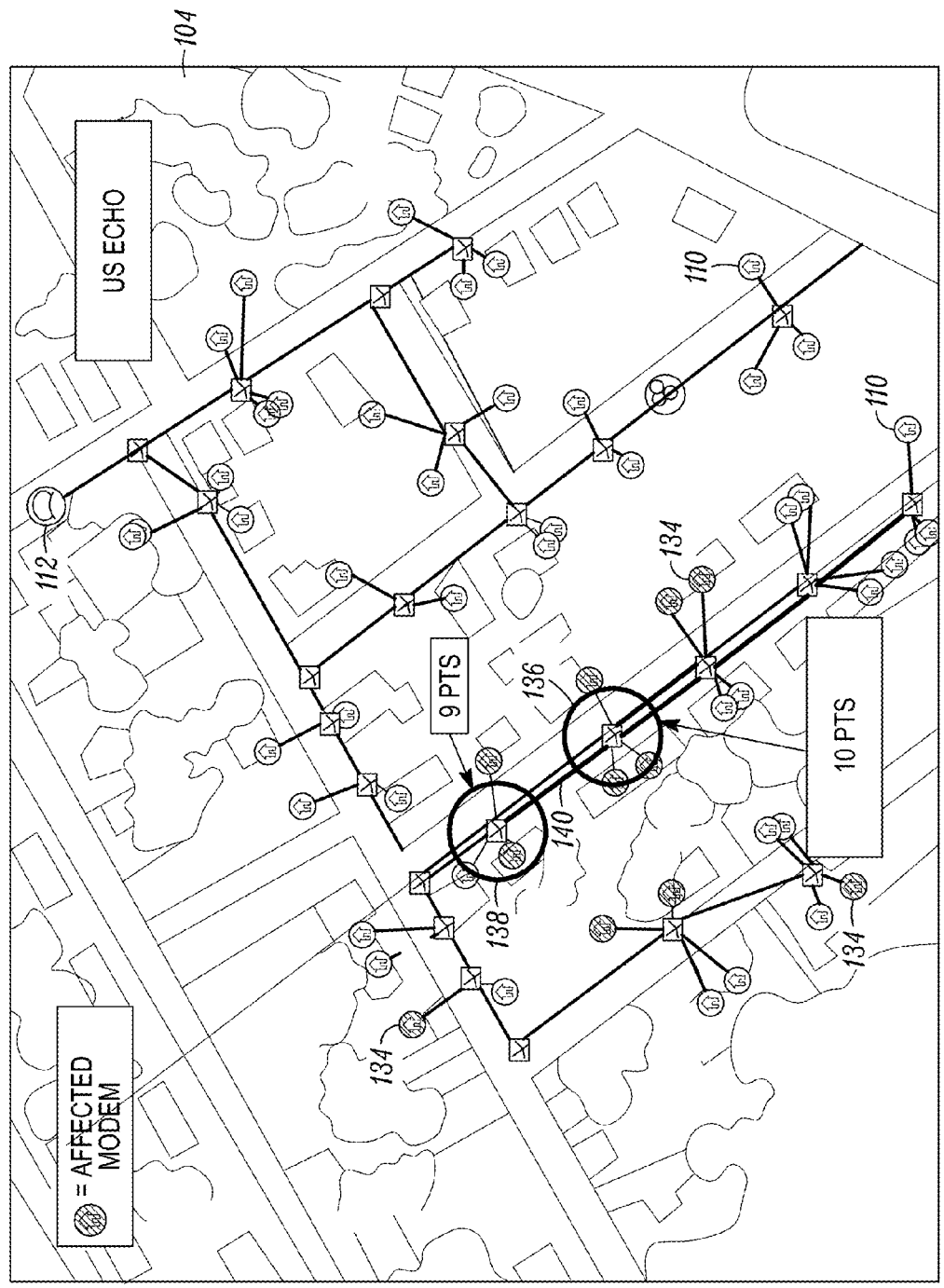
FIG. 17 is a view of the same section of the network as FIG. 15 in which cable modems affected by upstream echo at threshold levels are shown in accordance with an embodiment.

In FIG. 17, a number of the modems 134 in the same part of the network is identified as having unacceptable upstream echo (US Echo) levels. Based on an analysis of the US Echo data, it is determined that taps and splitter identified by the circle 136 represents the most likely source of the US Echo issue. Thus, for example, this location may be assigned a value of ten (10) points. Likewise, the taps and splitter identified by the circle 138 may be determined to be the second most likely source of the US Echo issue. Thus, for example, this location may be assigned a value of nine (9) points. The third most likely source of the issue shown in FIG. 17 is the cable 140 extending between the above referenced splitters.

Figure 18:
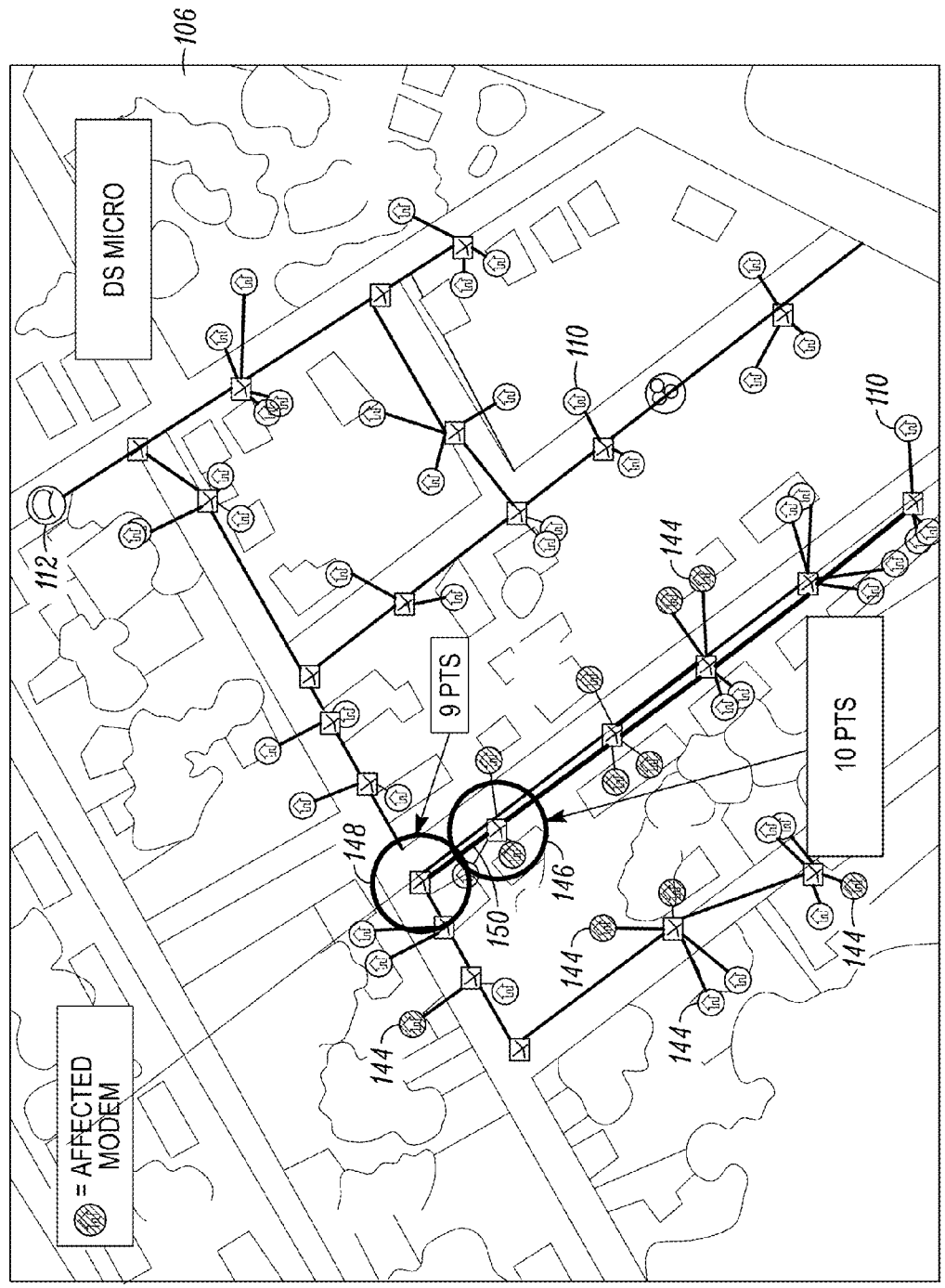
FIG. 18 is a view of the same section of the network as FIG. 15 in which cable modems affected by downstream micro-reflection at threshold levels are shown in accordance with an embodiment.

Finally, in FIG. 18, a number of the modems 144 in the same part of the network is identified as having unacceptable downstream microreflection (DS Micro) levels. Based on an analysis of the DS Micro data, it is determined that taps and splitter identified by the circle 146 represents the most likely source of the DS Micro issue. Thus, for example, this location may be assigned a value of ten (10) points. Likewise, the taps and splitter identified by the circle 148 may be determined to be the second most likely source of the DS Micro issue. Thus, for example, this location may be assigned a value of nine (9) points. The third most likely source of the issue shown in FIG. 18 is the cable 150 extending between the above referenced splitters.

As shown in the example of above, the four topologies 100, 102, 104 and 106 identify alarms based on different cable modem performance parameters (i.e., for DS SNR, DS Power, US Echo, and DS Micro) that may not be separate issues and that be associated with a single plant defect or root cause. As shown in FIGS. 15-18, the analysis of each of the different parameter (regardless of algorithm utilized) produces different priority lists with respect to the location that represents the first, second and third most likely locations of the fault. As also shown in FIGS. 15-18, points can be assigned to each of the top two highest priority inspection points in each topology (in this example, ten points for the highest priority inspection point and nine points for the second highest inspection point).

Figure 19:
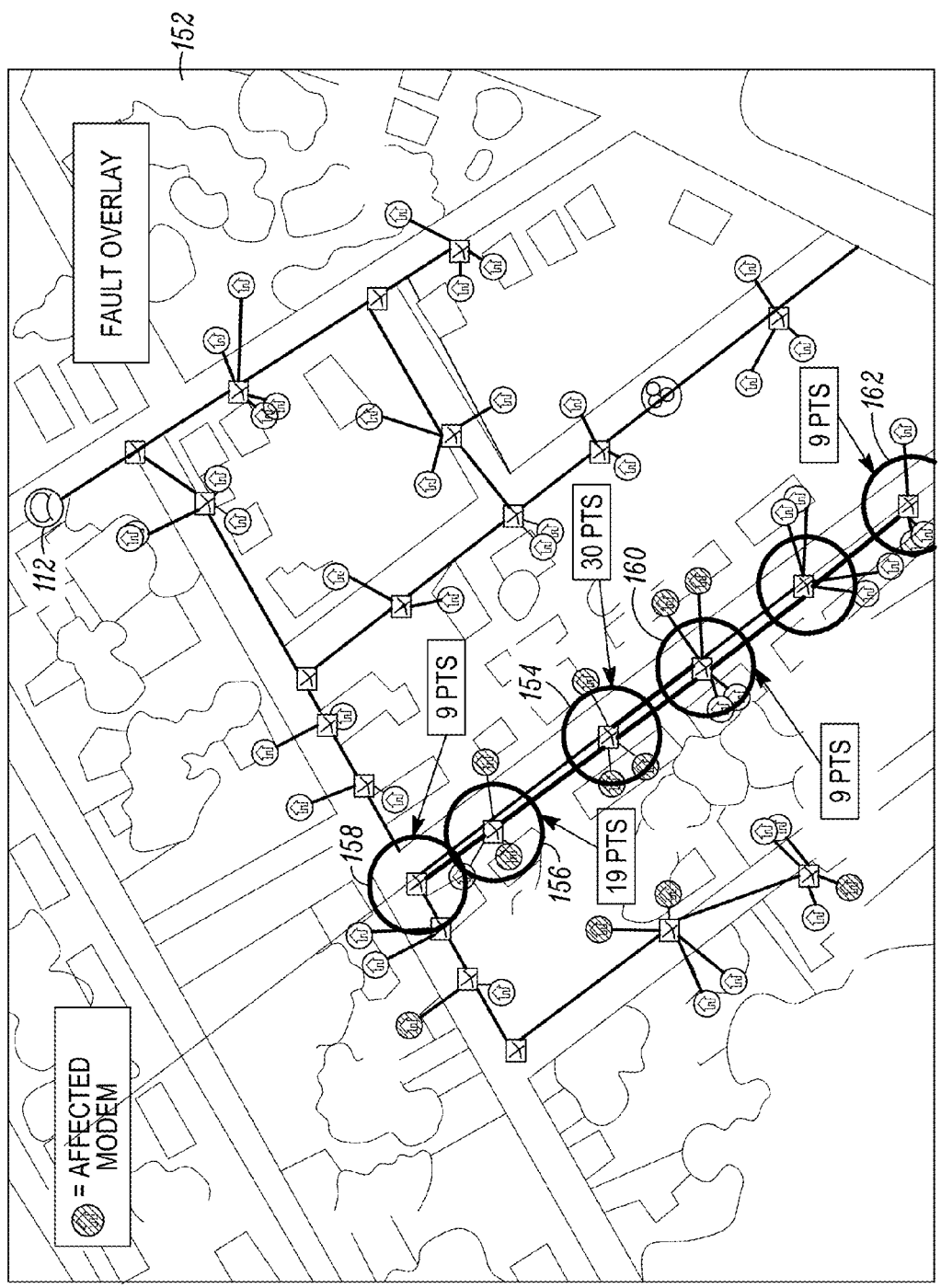
FIG. 19 is a fault overlay view in which the estimated fault locations shown in FIGS. 15-18 are combined in a single topology image in accordance with an embodiment.

In FIG. 19, each of the alarm topology scores discussed above with respect to topologies 100, 102, 104 and 106 and FIGS. 15-18 are totaled at each corresponding inspection point to create a topology map 152 in which an overall priority ranking based on a combination of the analysis performed independently for each of the DS SNR, DS Power, US Echo and DS Micro cable modem performance parameters. This essentially combines these four separate fault location determinations to provide an overall presentation of the problem. As shown in FIG. 19, inspection point 154 received thirty points, inspection point 156 received nineteen points, and each of inspection points 158, 160 and 162 received nine points.

Figure 20:
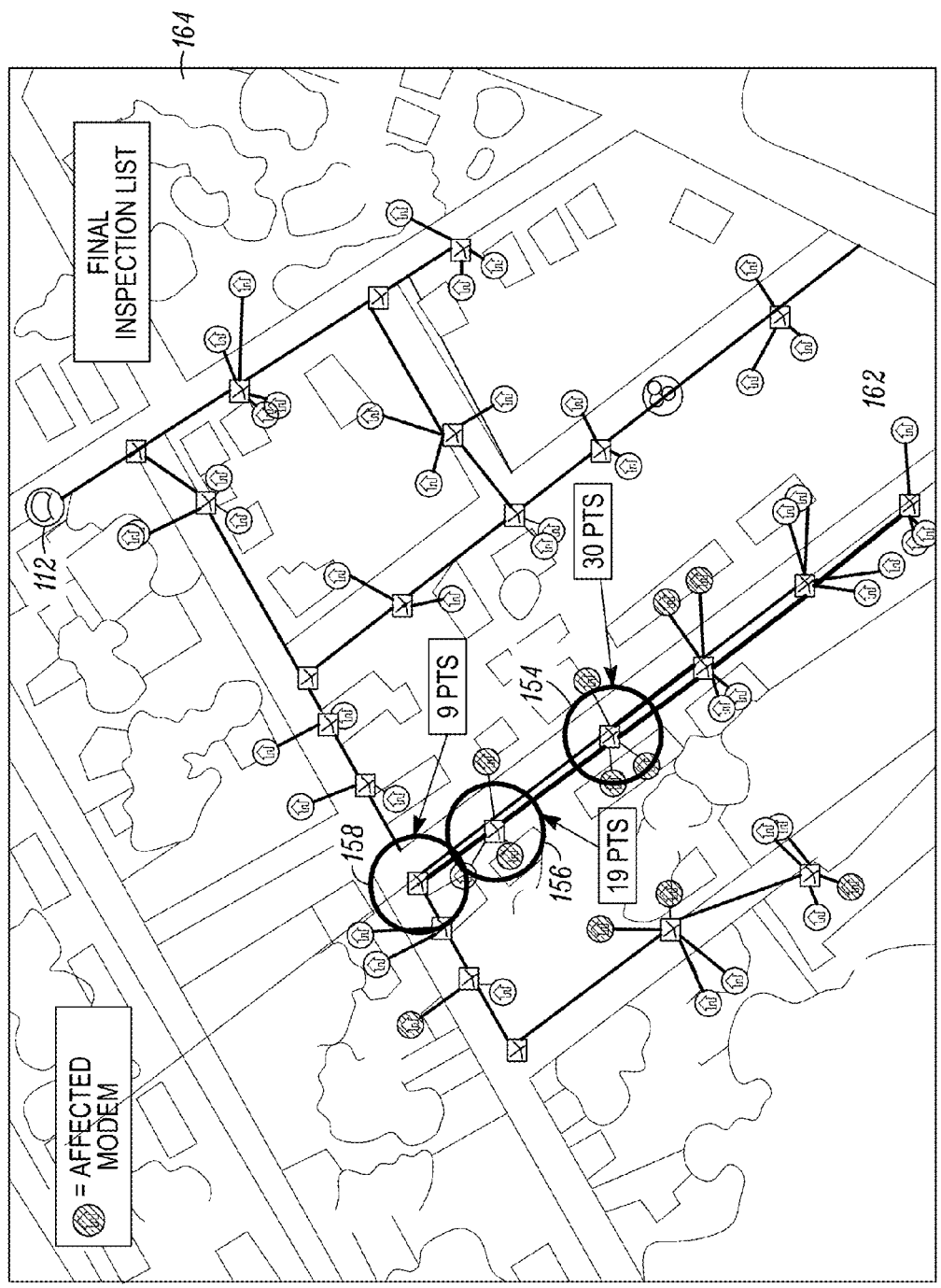
FIG. 20 is a topology image displaying a final prioritized inspection list for potential fault locations for the network shown in FIGS. 15-19 in accordance with an embodiment.

FIG. 20 provides a final topology map 164 identifying a final inspection list. According to the above described algorithm, inspection point 154 is identified as a location of the most likely source of the issue. In addition, inspection point 156 is shown as being the second most likely location of the issue, and inspection point 158 is shown as being the third most likely source of the fault or defect. Here, although inspection points 158, 160 and 162 each received the same amount of points, inspection point 158 is given priority over inspection points 160 and 162 since inspection point 158 is located further upstream and closest to the node 112.

Figure 21:
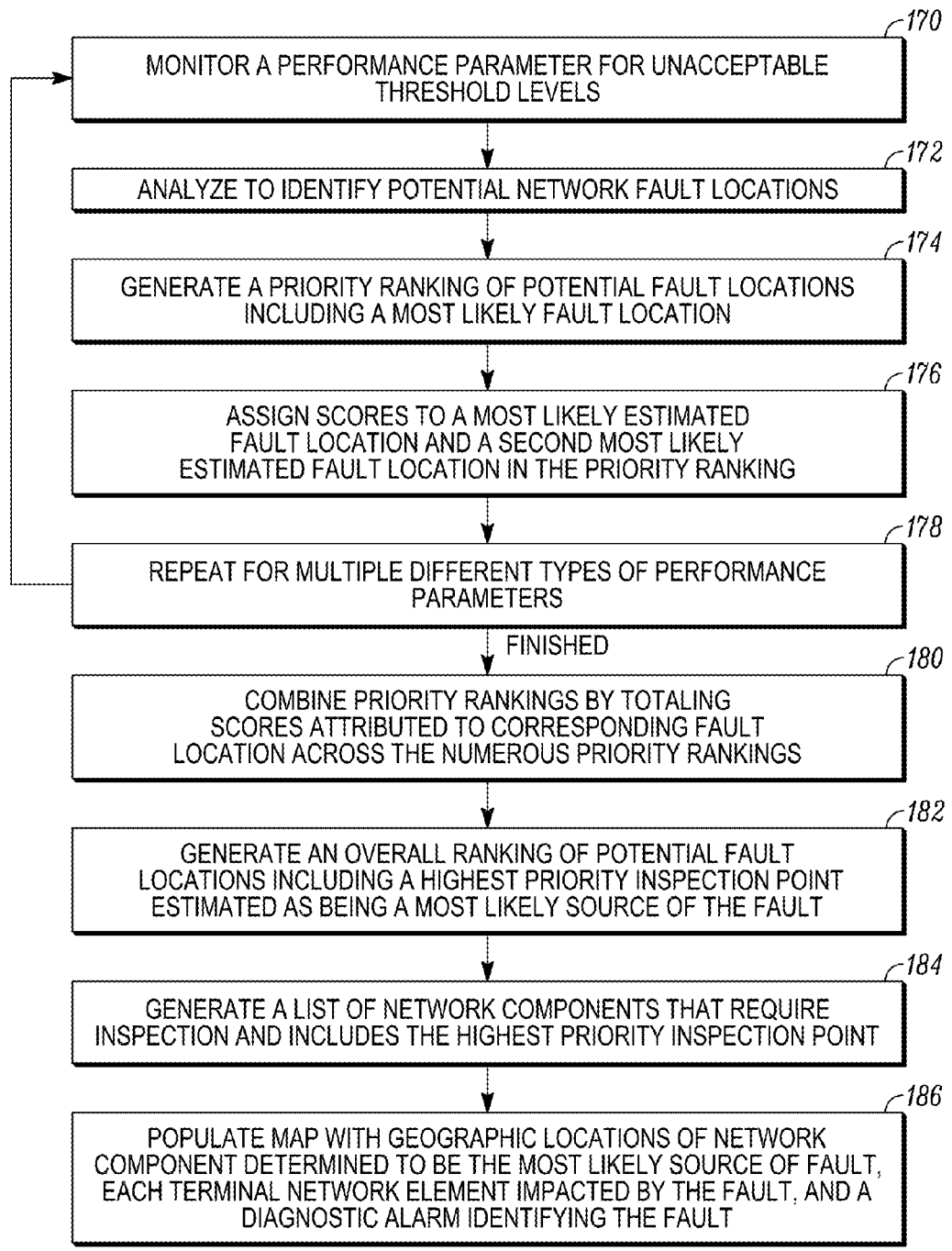
FIG. 21 is a flowchart of a method of estimating and prioritizing a location of a defect within a network in accordance with an embodiment.

FIG. 21 provides a flowchart for the above referenced algorithm, according to an embodiment, using fault signature overlay to prioritize network locations/components to be inspected in view of issues detected based on different performance parameters for cable modems served by a common node. In step 170, a first performance parameter is monitored for alarms with respect to unacceptable threshold levels via communications with a set of terminal network elements, such as cable modems, on the network. The performance parameter reported by the alarm is analyzed in step 172 to identify potential network fault locations on the network. In step 174, a priority ranking of potential network fault locations including a most likely estimated fault location is generated, and scores of pre-determined values are assigned in step 176 to at least the most likely estimated fault location and a second most likely estimated fault location within the priority ranking for the performance parameter.

Thereafter, in step 178, the above referenced steps are repeated a number of times for different types of performance parameters. As examples of performance parameters, any of the following may be monitored and analyzed: downstream or upstream signal-to-noise ratio (SNR); absolute and delta downstream power (DS Power) level; absolute and delta upstream power (US Power) level; upstream echo (US Echo) level; downstream micro-reflection (DS Micro) level; upstream filter coefficient ratio; carrier-to-noise ratio (CNR); and modulation error ratio (MER).

After all desired performance parameters have been monitored, analyzed, and used to generate and apply scores to priority rankings, the plurality of priority rankings can be combined. For example, the scores attributed to each corresponding potential network fault location given by the plurality of priority rankings can be totaled. See step 180. From this information, an overall priority ranking can be generated which includes at least a highest priority inspection point estimated as being a most likely source of a fault on the network. See step 182. Thereafter, if desired, a list of network components that require inspection and that includes the highest priority inspection point estimated as being the most likely source of the fault on the network can be generated. See step 184. As a further option, a geographically-accurate map can be populated with a geographic location of a network component determined to be the most likely source of the fault, a geographic location of each the terminal network elements impacted by the network fault, and a diagnostic alarm identifying the network fault (see step 186) and displayed.

A signal processing electronic device, such as a server, remote server, CMTS or the like can run a software application to provide the above process steps and analysis. In addition, a non-transitory computer readable storage medium having computer program instructions stored thereon that, when executed by a processor, cause the processor to perform the above discussed operations can also be provided.

Displaying Key RF Data in a Hierarchical Structure Based on Physical HFC Plant

Aspects of an embodiment provide an innovative way of displaying the cable network's RF parameters based on the network's physical topology. The method links the networks element with both its physical location as well as its vertical and horizontal affiliation. To prevent overwhelming the network operator or user with data, we defined the collected parameters as the 'monitoring mode' and the 'administration mode'. The network operator has the option to switch between these two modes freely with smart data collection and display.

In a conventional network monitoring system, the alarm system did not connect the problematic cable modems with its vertical and horizontal affiliations. More specifically stated, a traditional alarm system did not report the link between the problematic cable modems with its peer cable modems that even did not report an alarm, but could go wrong anytime because of its affiliation with the alarmed cable modem.

On the other hand, as the cable networks become bigger and bigger with more and more end users, the collected data could easily become overwhelming and make it difficult to get the needed information for effective network performance monitoring and trouble shooting. This will often make the system to only react passively to service affecting calls.

Aspects of the present disclosure are able, in an embodiment, to effectively link the cable modem performance to its peer cable modems horizontally and link to the RF tap, splitter amplifiers, fiber node all the way to CMTS vertically in a smart way that the cable operator can not only pinpoint the problematic cable modems fast, but also to trace the root cause of the problems to take preventive actions. It was designed in a smart way that the operator will always have the information it needs but will not be overwhelmed with data.

For example, in an embodiment, an RF data tree can be provided. Two or more modes can be defined, e.g., the administration mode and the monitoring mode. The administration mode will collect the network parameters including network usage, traffic burst, bandwidth allocation, end user bandwidth request as well as network topology with end users physical address and contact information. The Monitoring mode will collect RF operation parameters on the networks element including CMTS, fiber nodes as well as cable modems, the designed alarms systems will be based on preset monitoring threshold. In an embodiment, the alarms are designated to include severity levels (critical, major, minor) with corresponding color codes (e.g., purple, red and yellow).

In an embodiment, both the administration mode and the monitoring mode consisted of three levels. The first level is the CMTS level, the second level is the fiber node level and the third level is the cable modem level. The GUI will allow user to switch between the administration mode and the monitoring mode freely, while switching mode, the data level will stay the same, e.g. if the user is at second level in the administration mode, he will switch to second level in the monitoring mode with a click of button. The GUI will also allow the user to drill up or drill down the levels freely and the monitored RF data will automatically adjusted to not overwhelming the end user with too much data.

The GUI can provide, for example, a menu with an administration button and a monitoring button, with a column (e.g., to the left of the menu) listing the nested network information. In an embodiment, the largest part of the displayed GUI provides a map which is interactively connected to the column of listed information, e.g., the map display will zoom in or zoom out depending on the collapsed column list. The map can be configured to automatically zoom in or out by itself (i.e., without user interaction) as well. A more detailed GUI structural description is provided below.

The following discussion provides a more detailed description of an example of an embodiment.

On a first level in the administration mode, the GUI will show the whole topology of the CMTS network with the summery like the total number of fiber nodes, cable modems, RF amplifiers, the networks physical distance statistics, network usage, bandwidth allocation as well as traffic burst. In the monitoring mode, the GUI will summarize the performance alarm statistics, it will group the alarms with different methods including group the alarms according to fiber nodes, group the alarms according to logic service groups. The GUI will list the alarm statistics with the most sever alarm first by default.

With respect to a second level, herein designated as the "fiber node level," the GUI provides a button to switch between administration mode and the monitoring mode. In the administration mode, the collected network operation data include the network usage, the bandwidth allocation, the traffic burst, etc. In the network monitoring mode, the collected network operation data include the alarms belong to the fiber node, the alarms will be sorted with options; e.g., sorted as most severe alarms first, or sorted according to their parent affiliation. The sorting flexibility gives the network monitoring system the ability to indicate the weak link and to take preventive actions A user can drill up or drill down from the second level. The alarms will be linked to specific cable modems on the third level; for example, a click on a cable modem will lead to the specific cable modem's administration and monitoring data and can show the operation data of the cable modem, the physical location of the cable modem, the RF taps, the RF splitter as well as the RF amplifiers in the route. By way of example and not limitation, in U.S. Patent Publication No. 2013/0286852, illustrative detailed examples are provided concerning locating a cable modem as well as a signal route from monitored RF data.

A third level is herein referred to as the "cable modem level". In the administration mode, the collected data include the bandwidth usage, the channel allocations, the traffic burst pattern, the physical location of the cable modem, the affiliated RF taps, splitters as well as RF amplifiers, the service group the cable modem belongs to as well as end user contact information. In the monitoring mode, the collected network operation parameter include the upstream Tx power level, the downstream Rx power levels, US and DS channels used, the Rx signal to noise ratio, the pre and post equalized Rx MER (receiver modulation error ratio), the pre forward error correction BER (bit error ratio), the post FEC BER as well as micro-reflections.

The user or network operator can go into the third level by either clicking the specific cable modem in the left column or in the map. There will be a pop up window that contains all the information about the specific cable modems including the parameter that show alarms in the monitoring mode by clicking the right mouse button.

FIG. 22 depicts an RF Data Tree Process flowchart, according to an embodiment. The following provides a high-level program description of an embodiment of a data pruning process, in an illustrative embodiment:

The monitoring system GUI can contain two buttons each labeled as administration mode and as the monitoring mode. The user can click either button to expand the data or to switch between the two modes freely. When the user is looking at the level two data in the administration mode, by clicking the monitoring button, he can be led to the data on level two in the monitoring mode. The user can drill up or down the RF tree in the two modes as he wishes.

RF Data Tree GUI Structure Description

Flow diagram 2200 depicts an illustrative logic flow for a monitoring mode, an embodiment of which is depicted in a flowchart with a starting point labeled "Monitor," and an illustrative logic flow for an administration mode, an embodiment of which is depicted in a flowchart with a starting point labeled "Administration."

The disclosed cable network monitoring GUI can include two buttons including an administration mode button and a monitoring mode button. The GUI can have a menu item that contains common items like file, edit, data, view, etc. with drop down list. The left side column can list the monitored data in a nested tree structure; to the right of the column is a map showing the networks physical topology which can occupy the main GUI interface.

On the highest level, the administration mode or the monitoring mode controls the displayed information within the left column. The map can show the network topology of the whole network without giving much detail, in which case the GUI can provide to user an option to zoom into the map to get more detailed information (e.g., by a right click on the mouse, or using a middle mouse wheel, or from the menu). The user can drill down or drill up the data tree, e.g., in the left column by clicking the displayed information with the left mouse button; the information shown in the map can zoom in or out to synchronize with the data tree automatically. For example, if the operator clicked on a fiber node, the map will show the whole network topology of the network served by the fiber node, again user can zoom into the map with the click of the right mouse button or the mouse middle wheel or from the menu for more detailed information. By default, the alarms will be grouped by fiber nodes; user has the option to group the alarms by service groups by right click the mouse on the CMTS and select the option.

On the second level, the left column will show the alarms belong to a fiber node or a service group. The data tree will be sorted with the most severe alarms first, and grouped by their affiliations, for example, for densely located customers who share the same RF tap or splitters, the alarms will be grouped within the Tap or splitter. For customers share the same RF trunk amplifier, the alarms will be grouped by the amplifier, etc. On the second level, the map will just show the network topology served by the fiber nodes, user can zoom into the map by using the middle mouse button or from the menu or by clicking the right mouse button to track the network elements like RF splitters as well as RF amplifiers, etc. Alarms will be marked in the map with the same color code as shown in the left column.

On the third level, when the user clicked on a particular cable modems in the column, the map will show the cable modem with the affiliated RF taps, RF splitters or RF amplifiers in the map. Cable modems with alarms will be marked in the color code defined according to the alarms severity in the map. By clicking on a specific cable modem in the data tree or in the map, a pop up window will show the detailed information of the specific cable modem. The pop up window will contain the information as to the network usage, traffic burst, cable modem physical location, end user name as well as end user contact information including the phone number as well as e-mail address with hyper link in the administration mode. In the monitoring mode, the pop up window will contain the information as to the Transmitter power level, received power level, Rx SNR, pre-equalized and post-equalized Rx MER, pre-FEC BER and post-FEC BER as well as Tx and Rx modulation information.

A user can click on the fiber node or the CMTS tab in the data tree column to expand on the data tree hierarchy. The user can, for example, right click on the fiber node or the CMTS tab to switch between the map display and the table display, by default, the table will display the cable modems with alarms in the monitoring mode to not overwhelming the user with data, the showed alarms will be sorted according to the alarm severity by default. User can click the administration mode to show the administration data pertain to these cable modems, user can also click the specific cable modes to get the administration related data including physical address as well as end user information related to the specific cable modem.

By right click on the cable modem that shows service alarms, user has the option to display RF parameters of other cable modems within certain range of that cable mode, or to show RF parameters of other cable modems belong to the same service group with the alarmed cable modems to show the operation conditions of surrounding cable modems. The displayed RF parameters will be in a pop up table with the first row listing monitored RF parameters, right click on the parameter will give user the option to sort the parameter based with different sorting criteria including alarm severity sorting, parent sorting, physical proximity sorting, service group sorting, etc.

RF Data Parent Sorting Method

FIG. 23 depicts launching a hierarchical view from the map, according to an embodiment.

In an illustrative embodiment of a GUI, such as map screen 2300, the GUI allows the user to launch a details tree (such as by detail tree menu 2310) from any point representing a physical topology. The GUI provides options, for example, to automatically expand the tree, such as above, below, or in the just-selected location, as depicted in expansion options menu 2320.

FIG. 24 depicts a hierarchical threshold value view 2400, according to an embodiment. Depicted are menu entries for a fiber node 2410, tap 2415, service location 2420, modem 2425, downstream channel 2430, and upstream channel 2435. In the illustrative embodiment depicted, a channel threshold value 2450 can shown with respect to one or more channels. Expand/collapse selectors, such as expand/collapse selector 2440, are depicted, for allowing a user to click and expand or collapse a hierarchical view of subentries (e.g., rows of additional menu entries) under the menu entry corresponding to the expand/collapse selector 2440.

Aspects of the present disclosure provide an innovative RF data sorting method. Based on embodiments of the disclosed sorting method, a cable network monitoring system can, for example, not only trace down cable modems that showed alarms, but can also find potential problems with cable modems that may not show alarms. A network operator would otherwise be less likely, in the absence of such alarms, to have adequate time to take preventive actions.

A traditional cable network monitoring system's GUI comprised a map showing the network topology connected with the monitored system operational parameters listed as a column or table on the side. The listed operational parameters, for example, show the network elements' working condition, using alarms. As the cable network grows bigger and bigger with more and more end users, the collected operational data could become excessively large and unwieldy.

Traditionally, cable network monitoring systems used data sorting and filtering methodology based on service alarms severity, for example. Such systems are able to let the operator find out which cable modems raised the alarms, but are generally missing the sufficiently detailed information to potentially find the root cause of the alarm and possibly missing the opportunity of finding potential problems on other related cable modems.

A more effective data processing and sorting method can be provided, to let a network operator more easily pinpoint operational issues. Aspects of the present disclosure provide a data sorting method that not only lets the operator pinpoint the alarmed cable modems, but is able to link the alarms to a root cause, thus allowing an operator to take preventive actions.

Parent Sorting

Cable network monitoring system works on the basis of collecting and analyzing network operation parameters like cable modems Upstream Tx power as well as downstream Rx power, pre-equalized and post-equalized Rx MER, pre FEC and post FEC BER, receiver signal to noise ratio, etc. The monitoring GUI will comprise of a map showing the network topology with a column on the left side showing the monitored cable modems with alarms, alarms are defined using one of the monitored parameters, usually we used the pre-FEC and post FEC BER and set the threshold for the performance monitoring. By clicking either on the map or on the cable modems, the network operator can drill down to show the detailed monitored information with all of the collected operation parameters on the cable modem to get more information for network analysis.

In order for effective actions to be facilitated, an embodiment defines alarms as (for example) critical alarms, major alarms, and minor alarms. Examples of critical alarms include cable modems that show both unacceptable pre-FEC as well as post-FEC BER which means need immediate action. Examples of major alarms include cable modems that show unacceptable pre-FEC BER, but post-FEC BER is acceptable means operator can take quick action to prevent service calls. Examples of minor alarms can include cases in which both the pre-FEC and the post-FEC BER are acceptable, meaning an operator need to monitor the situation or take preventive actions. In an example of an embodiment, a GUI can use colors to indicate a severity level, e.g., purple to mark the critical alarms, red to mark the major alarms and yellow to mark the minor alarms.

As noted, a traditional alarm sorting method can miss a link between alarmed cable modems and their affiliations. Embodiments of the disclosed sorting methodology are able to sort the cable modems based on their parent affiliation. These affiliations could, for example, be cable modems sharing the same taps, the same trunk amplifier, the same service group, or the same fiber node.

Using embodiments of the presently disclosed data sorting method, the operator can not only more easily pinpoint a problematic cable modem, but also can find potential problems with the network as well and take preventive actions. As an example, if an RF trunk amplifier went bad by either giving out too much noise or the amplification factor is too small. Depends on the network deployment, it is likely that not all of the cable modems connecting to this amplifier will show alarms, but it is likely that more than a single cable modems connected with this amplifier will show alarms. By using this sorting methodology, the operator can find the root cause of the alarm and trace the problem to be a bad amplifier. In another example, if the monitored data grouped by service group showed alarms on more than one cable modems, it is likely that the switch card or router to setup the service group went wrong. The cable operator will examine the suspected upstream network element and take preventive actions to avoid service affecting alarms to a bigger scale.

Parent Sorting Implementation

Aspects of the present disclosure are able to sort service alarms according to their affiliation. Depending, for example, on how closely the end users are physically located, these affiliations could include commonality of RF taps, RF splitters, RF amplifiers, service groups, specific cable channels, or fiber nodes.

FIG. 25 illustrates a cable network system monitoring and debugging process flow, in an embodiment. In an illustrative embodiment, such as logic flow diagram 2500 as shown in FIG. 25, the data parent sorting process will find potential network problems would otherwise have been difficult to detect. If there is only one alarm, it is possible that it is just isolated issues with the particular end user, if there are more than one alarms, the parent sorting method can effectively isolate the problem to RF Tap, RF splitters, RF amplifiers, a particular fiber nodes or a particular CMTS Tx card and let the network operator to take preventive actions.

Data Pruning Example

In FIGS. 26A and 26B, tables show example of data series sorted with the most severe alarms first, as well as the disclosed parent sorting methodology, in accordance with an embodiment.

FIG. 26A depicts an illustrative example, in an embodiment, of a first table 2610 (labeled Table 1) of sample captured cable modem alarms sorted by severity.

FIG. 26B depicts an illustrative example, in an embodiment, of a second table 2620 (labeled Table 2) of sample captured cable modem alarms sorted using the disclosed parent sorting, in accordance with an embodiment.

Table 1 and Table 2 show examples of captured cable modem alarms. In Table 1, the alarms were sorted according to the alarm severity. In the depicted example, the table shows that all the alarms happened to fiber node A, but fiber node A could have a large number of end users. Accordingly, Table 1 only tells that something went wrong within the network serviced by fiber node A, but is missing an informative link from the fiber node down to the cable modems.

In Table 2, the alarms are sorted using an embodiment of the disclosed parent sorting method. Accordingly, the example depicted in Table 2 effectively groups the alarms according to the RF Taps used by the cable modems. As depicted, it is thus more clearly displayed to the user that tap-1 and tap-2 are likely having some problems, but there is only one cable modem that shows a critical alarm (on tap-3), which a user having ordinary skill in the art will be able to interpret to mean that the relevant problem probably is merely an isolated end user issue.

Conclusion

The above referenced devices for carrying out the above methods can physically be provided on a circuit board or within another electronic device and can include various processors, microprocessors, controllers, chips, disk drives, and the like. It will be apparent to one of ordinary skill in the art that the modules, processors, controllers, units, and the like may be implemented as electronic components, software, hardware or a combination of hardware and software. Some embodiments provide the interactive user interface discussed above on a mobile device, smartphone, tablet computer, laptop or desktop computer, or other type of computing or processing device. While some devices and processors may be described or depicted herein as separate entities, the functions may be combined into fewer or greater number of physical entities.

Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

While the principles of the invention have been described above in connection with specific devices, apparatus, systems, and methods, it is to be clearly understood that this description is made only by way of example and not as limitation. One of ordinary skill in the art will appreciate that various modifications and changes can be made without departing from the scope of the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for displaying information in a hierarchical structure, the method comprising:
in at least one processor of a server configured to be communicatively coupled via a network to a cable modem termination system (CMTS):
automatically evaluating groups of issues, each issue associated with one or more cable modems of a set of cable modems connected to the CMTS,
wherein a plurality of network components are shared in common by the set of cable modems, and
wherein each issue comprises one or more of a problem, fault, or alarm associated with the respective one or more cable modems;
automatically identifying, based on the evaluating, a plurality of likely root causes, each root cause associated with a particular issue in the groups of issues;
causing a display screen in communication with the server to display, in a graphical user interface, the plurality of likely root causes in a hierarchical display structure; and
causing the display screen to display in the graphical user interface, switchably or simultaneously with displaying the hierarchical display structure, a geographic map based on a physical topology of a hybrid fiber-coaxial network connected to the CMTS,
wherein the geographic map includes one or more locations corresponding to one or more cable modems associated with the plurality of likely root causes in the hierarchical display structure,
wherein the geographic map is zoomable, and wherein the geographic map and the hierarchical display structure are automatically synchronized by updating the hierarchical display to display a level of detail corresponding to a changed zoom level of the geographic map, and by updating the geographic map to display a level of detail corresponding to a current user-selected element of the hierarchical display structure, and
wherein the level of detail is one of a plurality of levels, the plurality of levels comprising a first level corresponding to the CMTS, a second level corresponding to one of the plurality of network components, and a third level corresponding to one of the set of cable modems.

2. A system for displaying information in a hierarchical structure, the system comprising:
a server comprising at least one computer processor, the server configured to be communicatively coupled via a network to a cable modem termination system (CMTS);
an electronic display screen communicatively coupled to the server and configured by the server to provide a graphical user interface;
the at least one processor of the server configured to:
automatically evaluate groups of issues, each issue associated with one or more cable modems of a set of cable modems connected to the CMTS,
wherein a plurality of network components are shared in common by the set of cable modems, and
wherein each issue comprises one or more of a problem, fault, or alarm associated with the respective one or more cable modems;
automatically identify, based on the evaluating, a plurality of likely root causes, each root cause associated with a particular issue in the groups of issues;
cause the electronic display screen to display, in the graphical user interface, the plurality of likely root causes in a hierarchical display structure; and
cause the display screen to display in the graphical user interface, switchably or simultaneously with displaying the hierarchical display structure, a geographic map based on a physical topology of a hybrid fiber-coaxial network connected to the CMTS,
wherein the geographic map includes one or more locations corresponding to one or more cable modems associated with the plurality of likely root causes in the hierarchical display structure,
wherein the geographic map is zoomable, and wherein the geographic map and the hierarchical display structure are automatically synchronized by updating the hierarchical display to display a level of detail corresponding to a changed zoom level of the geographic map, and by updating the geographic map to display a level of detail corresponding to a current user-selected element of the hierarchical display structure, and
wherein the level of detail is one of a plurality of levels, the plurality of levels comprising a first level corresponding to the CMTS, a second level corresponding to one of the plurality of network components, and a third level corresponding to one of the set of cable modems.

3. A method comprising, in at least one processor of a server configured to be communicatively coupled via a network to a cable modem termination system (CMTS):
automatically evaluating groups of issues, each issue associated with one or more cable modems of a set of cable modems connected to the CMTS,
wherein a plurality of network components are shared in common by the set of cable modems, and
wherein each issue comprises one or more of a problem, fault, or alarm associated with the respective one or more cable modems; and
causing an electronic display screen communicatively coupled to the server and configured by the server to provide a graphical user interface to display, in a hierarchical structure, information relating to one or more of the issues; and
causing the display screen to display in the graphical user interface, switchably or simultaneously with displaying the hierarchical display structure, a geographic map based on a physical topology of a hybrid fiber-coaxial network connected to the CMTS,
wherein the geographic map includes one or more locations corresponding to one or more cable modems associated with the plurality of likely root causes in the hierarchical display structure,
wherein the geographic map is zoomable, and
wherein the geographic map and the hierarchical display structure are automatically synchronized by updating the hierarchical display to display a level of detail corresponding to a changed zoom level of the geographic map, and by updating the geographic map to display a level of detail corresponding to a current user-selected element of the hierarchical display structure, and
wherein the level of detail is one of a plurality of levels, the plurality of levels comprising a first level corresponding to the CMTS, a second level corresponding to one of the plurality of network components, and a third level corresponding to one of the set of cable modems.

4. The method of claim 3, further comprising:
causing the electronic display screen to display the information in a graphical dashboard for a network monitoring system, wherein the graphical dashboard comprises a display of network monitoring information and alarms in a hierarchical, topological fashion.

5. The method of claim 3, further comprising:
causing the electronic display screen to display one or more RF parameters of the network based on a physical topology of the network.

6. The method of claim 3, further comprising:
linking a monitored element of the network with both a physical location of the monitored element and a relationship of the monitored element to one or more other elements of the network;
wherein each of the monitored element and the one or more other elements, respectively, is one of a group consisting of the set of cable modems and the plurality of network components.

7. The method of claim 6, wherein the relationship comprises one or more of a vertical affiliation and a horizontal affiliation;
wherein a horizontal affiliation between a first element and a second element comprises both being physically connected to a shared third element, the shared third element comprising one of a RF tap, a RF trunk amplifier, an RF splitter, a service group, and a fiber node, and
wherein a vertical affiliation between a cable modem and a second element comprises a physical connection between the cable modem and the second element, the second element comprising one of a RF tap, a RF trunk amplifier, an RF splitter, a service group, and a fiber node.

8. The method of claim 6, wherein the relationship comprises both a vertical affiliation and a horizontal affiliation;
wherein a horizontal affiliation between a first element and a second element comprises both being physically connected to a shared third element, the shared third element comprising one of a RF tap, a RF trunk amplifier, an RF splitter, a service group, and a fiber node, and wherein a vertical affiliation between a cable modem and a second element comprises a physical connection between the cable modem and the second element, the second element comprising one of a RF tap, a RF trunk amplifier, an RF splitter, a service group, and a fiber node.

9. The method of claim 6, further comprising:
displaying the information for the monitored network element in a plurality of user-selectable modes.

10. The method of claim 9, wherein the plurality of modes comprises a monitoring mode and an administration mode.

11. The method of claim 6, further comprising:
organizing the information in a hierarchical display based on a topology of a hybrid fiber-coaxial network.

12. The method of claim 6, further comprising:
organizing the information in a hierarchical display based on a topology of a hybrid fiber-coaxial network, wherein a plurality of cable modems are grouped for correlation.

13. A network monitoring system for displaying information in a hierarchical structure, comprising:
one or more computer processors of a network monitoring server configured to be communicatively coupled via a network to a cable modem termination system (CMTS); and
an electronic display screen communicatively coupled to the server and configured by the server to provide a graphical user interface;
the one or more computer processors configured to:
automatically evaluate groups of issues, each issue associated with one or more cable modems of a set of cable modems connected to the CMTS,
wherein a plurality of network components are shared in common by the set of cable modems, and
wherein each issue comprises one or more of a problem, fault, or alarm associated with the respective one or more cable modems;
cause the electronic display screen to display, in the graphical user interface, network monitoring information and alarms relating to one or more of the issues, the display of alarms organized in a hierarchical, topological fashion; and
cause the display screen to display in the graphical user interface, switchably or simultaneously with displaying the hierarchical display structure, a geographic map based on a physical topology of a hybrid fiber-coaxial network connected to the CMTS,
wherein the geographic map includes one or more locations corresponding to one or more cable modems associated with the plurality of likely root causes in the hierarchical display structure, and
wherein the geographic map is zoomable, and
wherein the geographic map and the hierarchical display structure are automatically synchronized by updating the hierarchical display to display a level of detail corresponding to a changed zoom level of the geographic map, and by updating the geographic map to display a level of detail corresponding to a current user-selected element of the hierarchical display structure, and
wherein the level of detail is one of a plurality of levels, the plurality of levels comprising a first level corresponding to the CMTS, a second level corresponding to one of the plurality of network components, and a third level corresponding to one of the set of cable modems.

* * * * *